United States Patent [19]
Othmer et al.

[11] Patent Number: 6,167,358
[45] Date of Patent: Dec. 26, 2000

[54] SYSTEM AND METHOD FOR REMOTELY MONITORING A PLURALITY OF COMPUTER-BASED SYSTEMS

[75] Inventors: Konstantin Othmer, Mountain View; Chris Derossi, San Jose, both of Calif.

[73] Assignee: NoWonder, Inc., Sunnyvale, Calif.

[21] Appl. No.: 08/994,840

[22] Filed: Dec. 19, 1997

[51] Int. Cl.[7] .................................................. G06F 11/00
[52] U.S. Cl. .......................................... 702/188; 709/217
[58] Field of Search .................................... 702/188, 182, 702/18.6, 81, 84; 364/468.15; 395/183.01, 184.01, 200.54; 390/870.01, 500, 514, 523; 709/217

[56] References Cited

U.S. PATENT DOCUMENTS

| | | | |
|---|---|---|---|
| 5,675,510 | 10/1997 | Coffey et al. | 364/514 A |
| 5,742,754 | 4/1998 | Tse | 395/183.14 |
| 5,758,071 | 5/1998 | Burgess et al. | 395/200.5 |
| 5,761,064 | 6/1998 | La et al. | 364/468.17 |
| 5,781,703 | 7/1998 | Desai et al. | 395/54 |
| 5,781,735 | 7/1998 | Southard | 395/200.54 |
| 5,796,633 | 8/1998 | Burgess et al. | 364/551.01 |
| 5,819,028 | 10/1998 | Manghirmalani et al. | 395/185.1 |

*Primary Examiner*—Patrick Assouad
*Attorney, Agent, or Firm*—Gray Cary Ware & Freidenrich LLP

[57] ABSTRACT

A system and method for monitoring the operation of a plurality of computer-based systems connected to a server, each computer-based system having a microprocessor that executes one or more software applications is provided wherein a separate programmable nub gathers information about the computer-based system to generate black box data, the black box information is communicated over a communications link to a server upon the occurrence of a predetermined triggering event and the black box data is processed to generate data that is used to monitor the operation of the plurality of computer-based systems connected to the server. An apparatus residing on a computer-based system for remotely monitoring the computer-based system is also provided.

97 Claims, 17 Drawing Sheets

SYSTEM AND METHOD FOR REMOTELY MONITORING A PLURALITY OF COMPUTER-BASED SYSTEMS

BACKGROUND OF THE INVENTION

This invention relates generally to a system and method for remotely monitoring a plurality of computer-based systems and in particular to a system and method for monitoring a software application or the microprocessor on a distributed set of computer-based systems in order to determine information, such as defects or usage patterns, about the software application, the system software, or any hardware that is part of or is connected to the computer-based system.

The tremendous expansion of the Internet has led to the expansion of the number features in software applications. The expansion of the Internet has also necessitated the more rapid development of various software applications and has changed various software development methodologies. For example, the technique for beta testing software applications has drastically changed. Prior to the proliferation of the Internet, a company might beta test a software application by distributing the software application by floppy disk to a limited number of beta testers since it was relatively inexpensive to do due to the costs of the disks. With the Internet, the process of beta testing requires only that the developer place the beta software application on its web site and then anyone interested in beta testing the software application may do so with almost no expense to the developer.

In order to properly beta test a software application and for the developer to benefit from the beta test, it is desirable to provide some medium for the beta testers to communicate with the developer who can gather the beta testers' bug reports and comments and correct any bugs This process was typically accomplished by a beta test coordinator who was responsible for gathering the relevant information and routing the bug reports to the appropriate engineers. No conventional system provides for the automated retrieval of the bug reports and comments from beta testers.

It is also desirable to be able to query various users to determine which features of a software application are being utilized and which ones are not being utilized. In one conventional system, pieces of code may be inserted into the software application that track the number of times a user accesses certain functions within the software application. Then, at some predetermined time, the number of accesses for each function may be uploaded to a central system that processes the gathered data. This conventional system is invasive since additional code must be incorporated into the software application. In addition, most programmers and developers do not want to add code into their software application in order to track the number of times each function in the software application is used.

In order to provide quality assurance (QA) feedback to a user of the software application, it is additionally desirable to be able to recreate a user's problem so that the Quality Assurance person can quickly help the user. In some conventional systems, the Quality Assurance person attempts to recreate the problem based on a user's recollections of the events, the user actions within the software application, such as entering the print routine, or the keystrokes that caused the error. This is very often difficult to accomplish since either the user may not remember all of the steps he took that caused the problem or the problem only manifests itself on the user's computer due to the configuration of the user's computer. In addition, determining the exact configuration of the user's computer is sometimes difficult since the user may not remember, for example, the type of graphics card that he installed in his computer. Therefore, it is desirable to be able to determine the configuration of a user's computer and capture information about the user's actions in order to help the Quality Assurance process.

For a software application being developed, it is often necessary to debug the software application. Some conventional systems permit a master computer to be used to debug a software application running on a single target computer. It is desirable to be able to permit a software application on a plurality of client computers to be simultaneously debugged.

In addition, it is desirable to be able to remotely monitor the functioning of a microprocessor. One conventional system is an internal circuit emulator (ICE) which replaces a microprocessor in a system being tested in order to help track what is occurring inside of the processor. An ICE, however, cannot be used to remotely monitor a microprocessor. No conventional system exists for remotely monitoring a plurality of client computers simultaneously to gather information about the client computers or software applications being executed by the client computers. Thus, there is a need for system and method for remotely monitoring a plurality of computer-based systems which avoid these and other problems of known systems and methods, and it is to this end that the present invention is directed.

SUMMARY OF THE INVENTION

In accordance with the invention, a system and method for remotely monitoring a plurality of computer-based systems is provided which detects defects or the usage of particular functions in a software application without adding pieces of software code to the software application. The system and method may also remotely monitor a plurality of computer systems and gather static information about the configuration of the computer systems or the software applications being executed by the computer systems or dynamic information about the system. The system may also reconfigure the system resident on each computer-based system in order to change the information being gathered from a particular computer-based system.

The system may also gather information about a computer-based system over a predetermined interval and then, upon the occurrence of a triggering event, transfer the accumulated information back to a central server in order to generate statistics about the frequency of each problem. In addition, the system may generate actual user usage information about, for example, each feature in a software application in order to permit the software developer to accurately determine the desirability of certain functions in the software application. During beta testing, the system also provides accurate feedback about errors or defects in a software application and permits a developer to accurately recreate an error in order to determine a proper solution to the error which reduces the need for quality assurance people. In addition, for an end user support environment, as the system or the developer determines solutions for an error, the system may generate automatic rules that send automatic messages to the user that indicate the solution to the known error which reduces the need for customer support people to repeatedly solve known errors. In the end user support environment, the system also generates detailed and accurate information to help the customer support person solve a current problem quickly.

In accordance with the invention, a system and method for monitoring the operation of a plurality of computer-based systems connected to a server, each computer-based system having a microprocessor that executes one or more software applications is provided wherein multiple pieces of information are gathered about the computer-based system. These pieces of information may be combined together into a collected data set that will be referred to below as a black box. Thus, the black box is a collection of the pieces of information and the black box is communicated over a communications link to a server upon the occurrence of a predetermined triggering event and the black box data is processed to generate data that is used to monitor the operation of the plurality of computer-based systems connected to the server.

In accordance with another aspect of the invention, an apparatus for monitoring the operation of a computer-based system connected to a central server is provided in which the computer-based system has a microprocessor that executes one or more software applications. The apparatus gathers information about the operation of the computer-based system to generate black box data and communicates the black box data to the server over a communications link upon the occurrence of any of a set of predetermined triggering events. The apparatus also receives configuration information from the server over the communications link to change the information that is going to be gathered and/or the set of triggering events.

In accordance with another aspect of the invention, a system for monitoring the operation of a plurality of remote computer-based systems connected to the system is provided in which each computer-based system has a microprocessor that executes one or more software applications. The system receives black box data from the plurality of computer-based systems over a communications link in which the black box data for a particular computer-based system contains information about the operation of the particular computer-based system. The system also stores the black box data and processes each piece of black box data to generate a database of information about the operation of the plurality of computer-based systems.

DETAILED DESCRIPTION OF A PREFERRED EMBODIMENT

The invention is particularly applicable to a system and method for monitoring a software application or a microprocessor on a distributed set of client computers in order to determine information, such as defects or usage patterns, about the software application or the microprocessor. It is in this context that the invention will be described. It will be appreciated, however, that the system and method in accordance with the invention has greater utility. For example, the system may be used to remotely monitor other machines which include a microprocessor, such as vending machines, scales, money changers, ticket dispensers, automatic teller machines (ATMs), blood glucose monitors, arcade video games, medical laboratory equipment, video tape players, private branch exchanges (PBXs), automobiles or stereo receivers, in order to determine if the machine is, for example, suffering a malfunction or to determine how much money has been collected by the machine.

Figure 1:
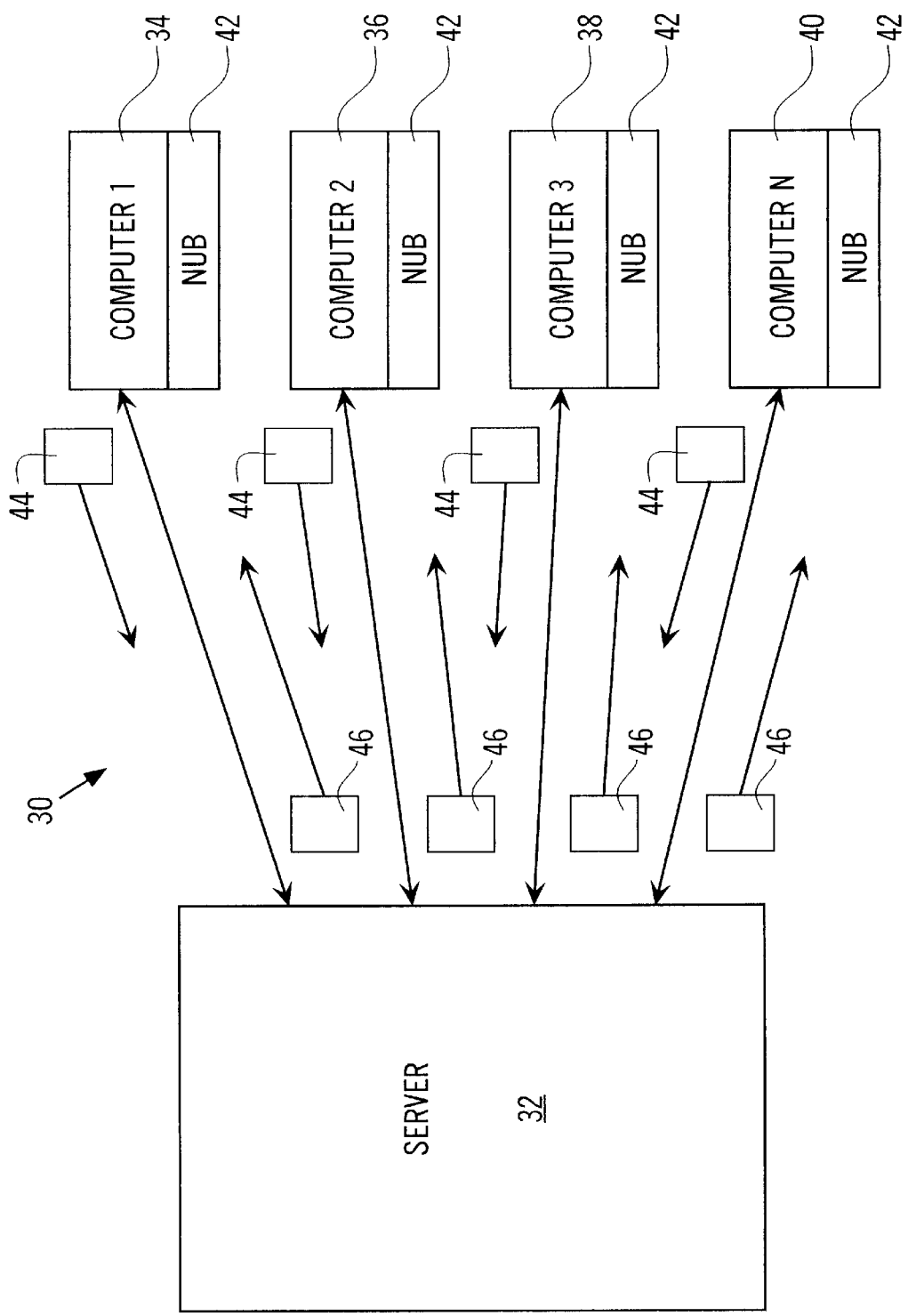
FIG. 1 is a block diagram illustrating a system and method for remotely monitoring a plurality of computer-based systems in accordance with the invention.

FIG. 1 is a block diagram of a system 30 for remotely monitoring a plurality of computer based systems in accordance with the invention. As shown, a central server computer 32 may be connected in some manner to a plurality of computer-based systems 34–40, such as a first computer system 34, a second computer system 36, a third computer system 38 and an Nth computer system 40. The server may be located on the site of a local area network that is connected to the plurality of computer-based systems or may be located, for example, at a developer's site which is remote from the plurality of computer-based systems. The plurality of computer-based systems may be connected to the server by local network connections, remote network connections, the Internet, or any other type of connection that permits the server to communicate with the computer-based systems. The computer-based systems may be typical client computer systems as is well known, but may also be any other type of computer-based system or client machine that may have a computer system integrated into the machine, such as a vending machine, a washer or dryer in a Laundromat or an automatic car washing machine.

In accordance with the invention, various information about each computer-based system or about a software application being executed by the computer-based system may be gathered by a small software application being executed by the computer-based system referred to as a "nub" portion 42 residing on each computer-based system. The nub gathers information about the operation and execution of a software application being executed by the computer-based system or about the operation of the microprocessor within the computer-based system as described below in more detail. For example, the nub may execute a plurality of loops in order to determine the speed of a microprocessor in the computer-based system. The nub 42 may be a software application being executed by each computer-based system, as described below in more detail, but may also be a hardware circuit. Each nub on each computer-based system may be configured, e.g., under program control, to accumulate data or information about the state or operation of the computer-based system or about one or more software applications being executed on the system.

The various information or data gathered by the nub may be collected into a "black box" data structure 44 that may be transmitted over the communications link to the server upon the occurrence of one of a plurality of predetermined trigger events, as described below. The details of the black box are described below with reference to FIG. 9. Generally, however, the black box has one or more data records that store various pieces of information about the computer-based system or its operation. For example, the black box may contain pieces of information about events that occur in a software application, such as an ASSERT instruction being encountered or parameters about the computer-based system, such as the amount of installed memory. The black box may contain a plurality of data records in which each data record contains different information about the computer-based system. In addition, the nub in each computer-based system generates its own black box so that the central server computer receives a plurality of black boxes. In a preferred embodiment, each data element in a black box may optionally have a timestamp associated with it so that a user of the system may determine a sequence of events that occurred prior to a triggering event, such as a computer crash. Thus, the server may receive one or more black boxes from each computer-based system 34–40 so that the operator of the overall system may remotely monitor the plurality of the computer-based systems simultaneously using a nub resident on each computer-based system.

The server may, in turn, transmit customized configuration data 46 in a configuration file to each computer-based system so that each nub 42 in each computer-based system may be customized so that the information gathered by each nub may be selectively specified. The configuration file for each computer-based system may be updated using several techniques. In one technique, that may be used when the computer-based systems does not have static IP addresses and thus cannot be addressed, each computer-based system periodically polls the server to determine what is the current version of the configuration file and then, if it does not have the current version, begins a normal server transaction (without uploading a black box) in order to obtain the updated version of the configuration file. In another technique, that may be used for computer-based systems connected to a local area network (LAN) which is individually addressable, the server contacts each computer-based system anytime that the configuration file changes. In a preferred embodiment, the server sends a broadcast message indicating the latest version of the configuration file and then each computer-based system checks which version of the configuration file is currently has and, as described above, can initiate a download of the new version of the configuration file if needed. This preferred technique has the advantage that the computer-based system initiates the server connection similar to when the computer-based system uploads a black box. In another technique with addressable computer-based systems, the server keeps track of the configuration file version for each computer-based system and then directly contacts each computer-based system with an out-of-date configuration file. This technique may also be used to determine when the broadcast message is no longer needed.

The server may receive the black boxes from the plurality of computer-based systems and generate various statistical data that may be used for a plurality of purposes. For example, the data generated by the server may be used to monitor a system, such as a vending machine, for mechanical or electrical failures, to determine usage statistics for one or more features of a software application being executed by the computer-based system, to determine errors or bugs in a software application, or to determine a sequence of events or actions that occur in the microprocessor prior to a triggering event, such as a software crash. The operator of the system may also use the server to generate a set of rules to handle known errors. A rule may, upon the detection of a known error, for example, send an automatic message to the user explaining the solution to the error. For example, it may be known that a particular newer version of the operating system is required to operate properly with a particular software application. Therefore, a rule may be generated by the server which sends a message to the user indicating that the user needs to upgrade to the newer version of the operating system in order to use the particular software application. Thus, when the nub on the user's computer detects an error indicating the wrong operating system version, the server may generate the automatic message without any time being spent by the customer support person.

The reconfiguration of the data being gathering by the nub may also be used to diagnose and troubleshoot problems or bugs after a software application has already been released to the users. For example, once a problem with a software application is diagnosed using the black boxes, the configuration file may be updated to gather different information in the future so that a recognizer routine, as described below, may be created which will automatically troubleshoot the problem in the future for a user. The update to the configuration file may include setting a new watchpoint, as described below, to gather other information about the problem. More details about the reconfiguration are provided below with reference to FIGS. 11A, 11B and 13.

Before describing the system in more detail, several examples of how the system may be used will be provided. In one example, a developer of a software application, such as a web browser, would like to track bugs for a beta test of his browser on thousands of client computers connected to the Internet. The developer will set-up a central server in accordance with the invention and will distribute the browser software application with the client nub to the various client computers. As each client computer uses the beta version of the browser software application, the client nub gathers information about the execution of the browser software, such as bugs or crashes. Each client nub on each client computer then transmits the information enclosed in a black box to the server at the developer's premises over the Internet upon the occurrence of a predetermined trigger event, such as a crash of the browser software. The developer can then determine, based on the large amount of black box information (e.g., the black boxes from the thousands of client computers that are using the beta browser software and have a nub), what caused the crash (i.e., a user error, a web site error or a bug) and then provide, for a bug, a patch to each of the client computers running the new browser software. For the web site induced crash, the developer may change the browser application to handle that type of web site in the future. In this manner, the developer can rapidly generate a large amount of information about the operation of his browser software application on a plurality of different client computers and diagnose any bugs in the new browser software application.

To better understand the invention, a brief description of remotely configurable watchpoints and an example will be provided. A more detailed description of the remotely configurable watchpoints are provided below with reference to FIG. 13. Assume that a problem which a developer is trying to diagnose happens very infrequently and the developer has not yet determined the steps necessary to reproduce the problem. By updating the configuration file to set new watchpoints and gather other information not previously gathered, the developer can debug the problem on multiple machines simultaneously since each nub on each computer-based system will begin gathering the information. In order to change the information gathered by the multiple computer-based systems, the developer creates a new configuration file that contains instructions, preferable in the form of data since actual code in the configuration file may pose a security risk, about the additional watchpoints the developer wants to monitor. This new configuration file is then communicated to all of the client computer-based systems executing the software application that the developer is attempting to debug. In most cases, the reconfiguration of the client nub occurs transparently to the user since the user may actually be using the software application in question as the new watchpoints are set. Then, any of the multiple computer-based systems that experience the hard to reproduce bug send a black box to the server with the information about the hard to reproduce problem. Thus, a developer can troubleshoot a problem by using all of the connected computer-based systems rather than trying to reproduce the problem on a single computer.

As another example, an information systems manager in a large corporation may want to monitor the various client computers that are connected to the corporation's internal network in order to diagnose user problems and network problems. Therefore, the manager would attach a server in accordance with the invention to the internal computer network and distribute a client nub to each client computer connected to the internal network. For this example, each client nub on each client computer may gather information about the various software applications being executed by each client computer as well as the physical configuration of each client computer. When a user of a particular client computer has a software crash, the manager may use the information from the black boxes for that particular client computer to help determine the cause of the crash. The manager may also be able to determine if the crash resulted from human error (i.e., the user selected the wrong function to execute) or from a bug in the software application. The server could also, automatically send an E-mail to the user of the client computer when a known error occurs. For example, the server may determine, based on the black box information, that the user must have more memory to run a particular software application and sends an E-mail to the user indicating that he should talk with the Information Systems people about getting some more memory.

As yet another example, as the server gathers information about the particular software application or microprocessor, that gathered information may be used to generate a knowledge base of information. The knowledge base may be further expanded by remotely configuring watchpoints in order to gather additional information. This knowledge base may be used for a variety of purposes, including generating recognizer rules which help automate the process of diagnosing and trouble shooting problems with a software application. Now, a first embodiment of the invention that remotely monitors a plurality of computer systems connected to a network will be described.

Figure 2:
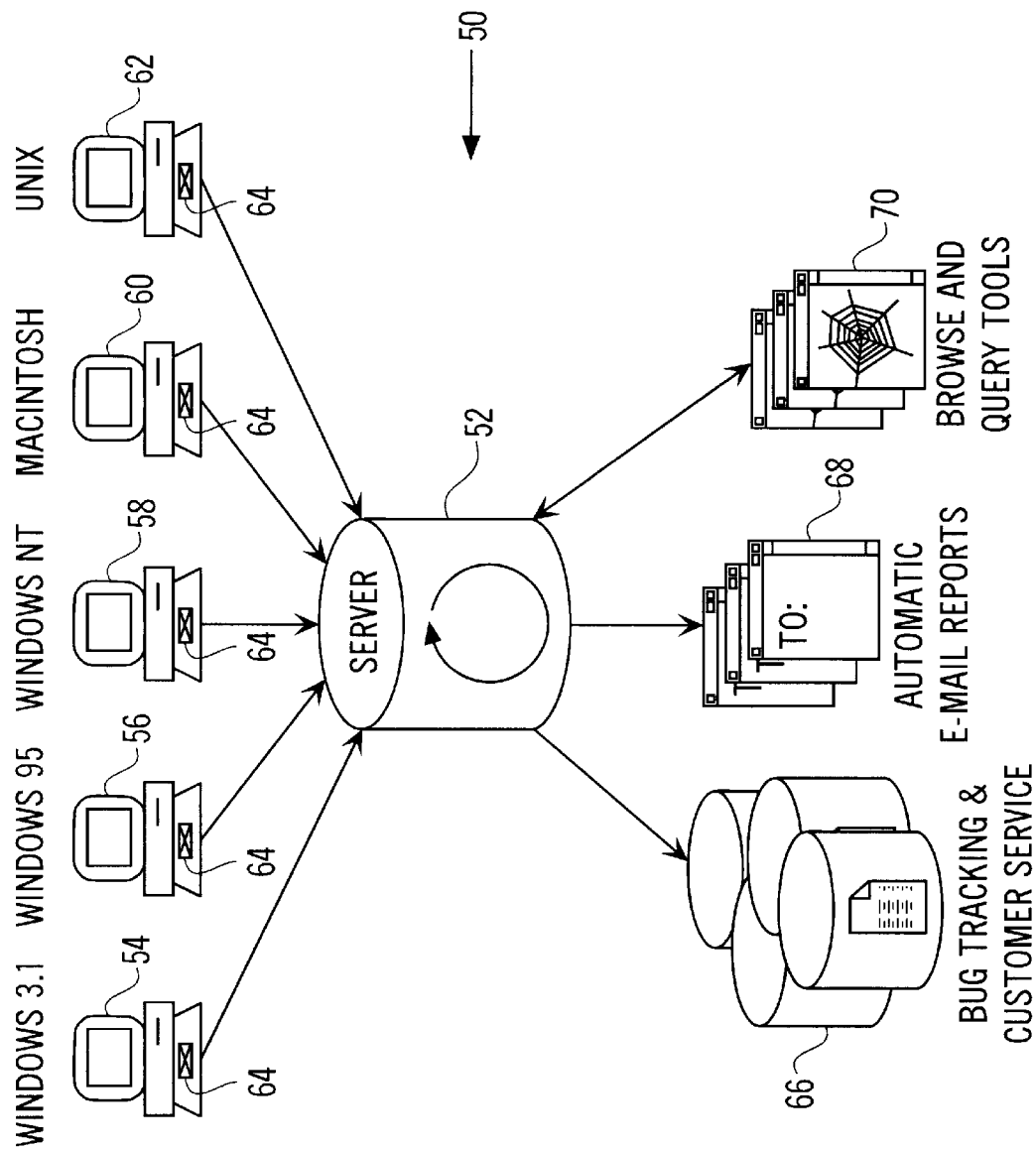
FIG. 2 is a block diagram illustrating a first embodiment of a system and method for remotely monitoring a plurality of computer-based systems in accordance with the invention.

FIG. 2 is a block diagram of a first embodiment of a system 50 for remotely monitoring a plurality of computer-based systems in which the plurality of computer-based systems are a plurality of client computers that are connected to a server 52. The plurality of client computers may use different operating systems, such as a Windows 3.1 system 54, a Windows 95 system 56, a Windows NT system 58, a Macintosh system 60 and a UNIX system 62. A nub 64 is resident on each client computer and operates to gather information about the particular client computer or one or more software applications being executed by the particular client computer, as described below. Thus, in accordance with the invention, the system may gather information from a plurality of different client computers that may be executing different operating systems and may combine that information into useful statistics about the client computers or about the software applications being executed by the client computers, as will be described below with reference to FIGS. 14–16.

The information and/or data gathered by the nub may include static system configuration information, dynamic system and application information and application-specific information. The static system configuration information may include the amount of memory in the client computer, the type and/or version of the processor in the client computer, the size of the hard disk in the client computer, the type of the video card in the client computer and any other information about the physical configuration of the client computer. The static information may also include static data about a software application on the client computer, such as a version number. The dynamic system and application information may include the state of the threads or memory system at the time of a trigger event, such as the crash of a software application.

The application-specific information may include any information that is specific to a particular software application being executed by the client computer, such as the last action taken by a user or the last Uniform Resource Locator (URL) visited by the user. To gather the application-specific information, the client nub 64 may be integrated into the particular software application as described below. In addition, however, the client nub may also gather the application specific information using the remotely configurable watchpoint technique. In particular, the developer of the software application would create a watchpoint file that contains the source code locations that he is interested in reviewing. The source code may be identified by a function name or by browsing the source code and identifying particular lines of the source code. Once a part of the source code is selected, the developer may attach an action that occurs anytime of the watchpoint is reached. The actions may include counting the number of times the watchpoint is reached, profiling the source code between two watchpoints or registering memory to be captured upon the occurrence of a triggering event. Using the symbol output and other build information, the server maps this watchpoint file to PC offsets useful to the client nub. The mapped watchpoints are then sent to the client nub via the client configuration file, and using the capturing of the interrupt vectors, as described below, the system can gather any information of interest without requiring the developer to add code into his software application. In addition, if the source code changes, the watchpoints may be updated. In addition, if the developer removes some source code, the system may indicate to the developer that some watchpoints are no longer valid.

The data and information gathered by the nub 64 may then be transferred to the server 52 by a transceiver 84 (as shown and described with reference to FIG. 3) at a predetermined time, as described below. At the server, the black box data and information may be stored and processed, as described below with reference to FIG. 8, and various actions may be taken by the server. For example, the server may interface with, communicate and share data with one or more existing bug tracking and customer service databases 66. The server may also include an automatic electronic mail (E-mail) report generator 68 and a query tool 70. The database 66 stores the processed information for the purposes of generating data about customer problems and data about current bug problems within certain software applications so that the developer can track current bugs and trends in customer service calls. The automatic E-mail report generator 68 sends reports to the developer containing information about the black boxes that have been sent from client computers and statistics about the performance and usage of client computers and software applications on client computers. The query tool 70 permits the developer to browse/query the information stored on the server 52, as described below. Now, details of the portion of the system that resides on the client computer will be described.

Figure 3:
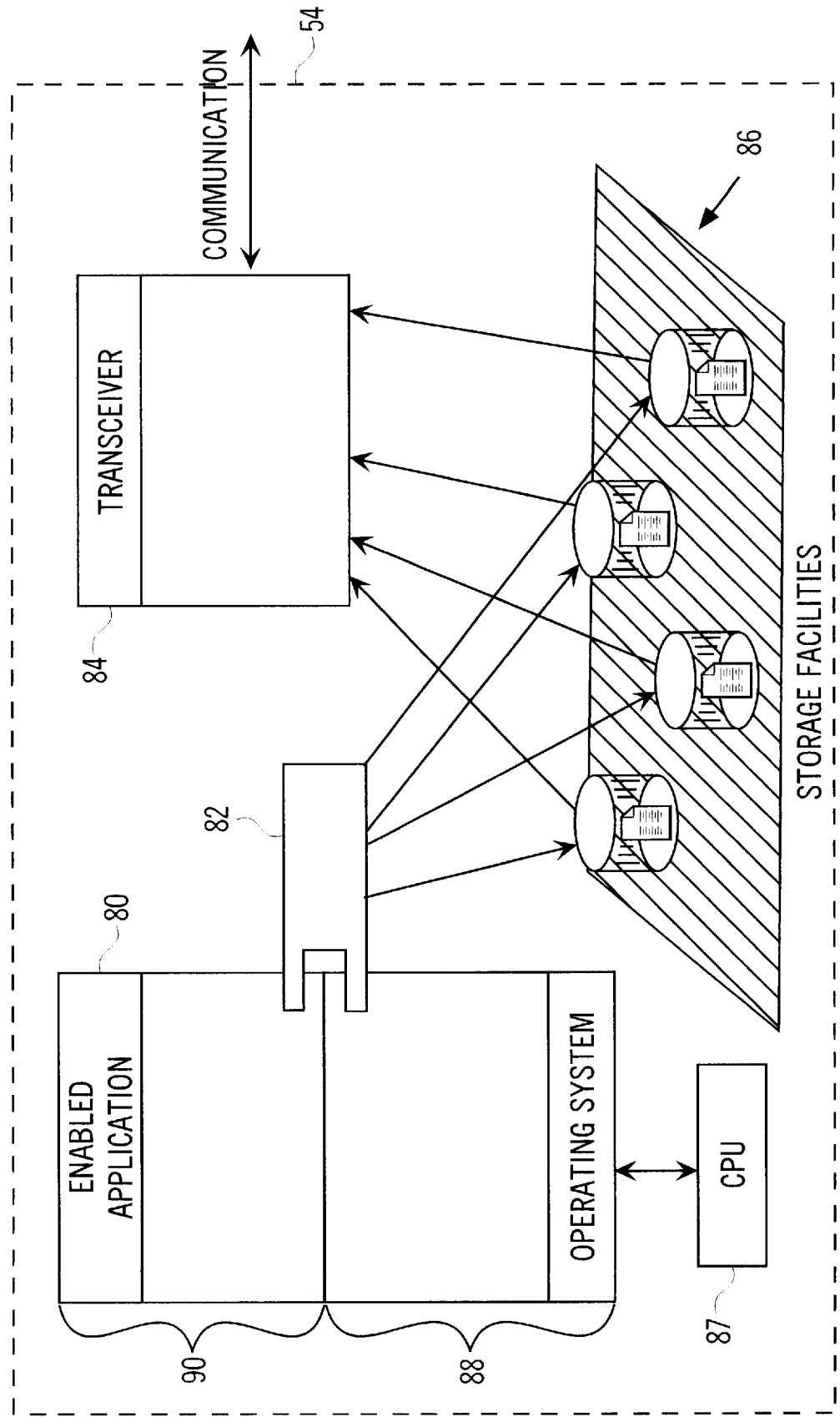
FIG. 3 is a block diagram illustrating more details of a portion of the system resident on the client computer in accordance with the invention.

FIG. 3 is a block diagram illustrating the details of the portion of the system, in accordance with the invention, that resides on the client computer 54. In this example, the client computer 54 is using the Windows 3.1 operating system, but the portion of the system residing on the client computer is similar for each type of operating system. As shown, the client computer 54 may include a memory 80, a client nub 82, a transceiver 84 and a black box storage facility 86. The client nub and the transceiver may be software applications that are being executed by the central processing unit (CPU) 87 of the client computer. The memory of the client computer may store an operating system 88 and a nub-enabled software application 90. The nub-enabled software application may be a software application that has been specifically written so that the client nub has access to the software application so that application-specific information, as described above, may be gathered by the client nub. For example, a nub-enabled Internet browser software application may permit the client nub to gather information about the URL's that are accessed by the user of the client computer so that the developer of the browser can determine, in the event of a crash, the last URL that was accessed by the user to determine if the crash was caused by the URL or by a bug in the browser software application. As described, similar actions may be taken by a client nub which is not integrated into the software application using the configurable watchpoint technique as described above.

As described above, the client nub 82 may gather various information about the client computer, such as static hardware and software configuration information, dynamic system and application information, and application-specific information. An example of a technique for gathering each type of information will now be described. The static system configuration information may be gathered at any time. In a preferred embodiment, the static information is gathered before a particular software application is launched by the client computer or each time the client computer is powered up or rebooted since this information does not often change during the operation of the client computer. In addition, once the initial configuration of the client computer is determined and the server has a record of the initial configuration, only changes to the client computer configuration are bundled up in a black box and transmitted to the server.

The dynamic system and application information may be gathered when a predetermined trigger event, as described below, occurs. The particular trigger events are defined by the developer or operator of the system in accordance with the invention and may include processor failures, such as a divide by zero or an illegal memory access, operating system failures, such as out of memory errors and application failures, such as an illegal document size. The processor exceptions and failures, which may be caused by a software application error, may be gathered in different manners depending on the type of operating system being used on the client computer. For example, for a 32-bit Windows computer or a Power Macintosh computer, the operating system provides an exception handler interface which is called when a low level processor exception occurs. The nub can gather the relevant information from the exception handler interface. For a 16-bit Windows computer and an earlier version of the Macintosh, a piece of code, known as an exception call chain, may be inserted into the operating system so that when an exception occurs the nub obtains control and gathers the necessary information. If the trigger condition occurs, the black box information may be saved in the black box storage facilities, as described below.

The operating system failures may be determined by intercepting the operating system calls and detecting a failure when the call is returned. For example, on a Macintosh computer, calls to the memory system may be intercepted so that a call to a desired function is executed and then the return from the desired function may be checked to determine if an error has occurred (i.e., the computer is out of memory). If there is no error, nothing happens, but if an error is detected, the nub gathers information about the error such as the time the error occurred and any additional information about the error.

Any application-specific information may be gathered using a plurality of different methods. Two examples of these method will now be described. In a first method, part of the application programmatic interface (API) for a nub-enabled software application may include a command that directly adds information into the black box. In a second method, server programmable watch-points may be used in which the nub overrides a portion of the software application and re-routes the flow of control through some additional code which can increment a counter or gather a block of data and add the data to the black box. Once the additional code has been executed, the software application continues executing in a normal manner. This method permits the developer of a software application to gather additional information about a software application that has already been distributed. The server programmable watch-points may also permit the system and the operator of the system to quickly diagnose certain bugs or errors by gathering a large amount of information relating to that bug from the plurality of client computers connected to the server. Once all of the information, as described above, has been gathered, the nub may organize that information into a black box and the black box may be stored on the client computer for later transmission to the server. The storage of the black box will now be briefly described.

In order to store the black box information, the system in accordance with the invention has to be able to store the black box information even in an unstable computer environment. In order to store the black box information, a storage manager 92, shown in FIG. 4, may store the data at the time of a trigger event, such as the crash of the client computer in the black box storage facilities 86. The storage manager may store the black box information using several different methods when the operating system of the client computer is unstable depending on the availability of certain resources in the client computer. For example, if the file system of the client computer is available, then the black box information is stored in a conventional manner using the file system. If the file system is unavailable due to a corruption of the file system, the storage manager may attempt to store the information to the hard disk of the client computer directly using the disk drive interface, such as an IDE or SCSI or any other disk drive controllers, without using the file system. To accomplish this, the client nub allocates space on the disk at a time when the file system is stable. Then, at the time of a trigger event (i.e., when the system is potentially unstable), the nub may use the low level drive interface routines to write data into the pre-allocated file. This technique keeps the file system synchronized with the file of the disk, but the contents of the file can be updated to contain black box information that could not have been written using the file system.

If access to the hard disk or the disk drive controller is unavailable, the storage manager may attempt to store the black box information in a plurality of different memory locations, such as the random access memory (RAM) or video random access memory (VRAM) of the client computer since, even during a short power outage, some of the data stored in the RAM or VRAM may be retrievable. In fact, when a computer reboots, the contents of the RAM may be destroyed due to memory testing during start-up, but the VRAM on the video controller card is not tested and may have a better copy of the data. To further increase the chances that a good copy of the data may be retrieved, the data is stored using standard forward error correction techniques so that some errors may be corrected. Once the operating system is stable again, such as after the shut down of the client computer, the data from the various locations is retrieved and the forward error correction is used to correct errors. In the event the black box information is stored in the RAM or VRAM, the black box information may be moved to the hard disk once the client computer has been restarted or rebooted. In another embodiment, the portion of the system residing on the client computer may include a separate hardware device that connects to the client computer and contains a memory that may be used to store the black box information.

Once a trigger event occurs and the black box has been written to some storage location, the transceiver may retrieve the black box information from the black box storage facilities and send the black box information to the server. The transceiver may transmit the black box information to the server at a time when the client computer is already sending data so that the transmitting operation of the transceiver runs in the background and is transparent to the user. In addition, since the total amount of black box data being transmitted to the server is relatively small, it may be easily transmitted in the background. Thus, in accordance with the invention, a separate communications session to transmit the black box information is not necessary. The transceiver may use different protocols to transmit the black box data, such as the GET command in the hyper-text transport protocol (HTTP) which is well known for a client computer attached to the web so that the transmission of the black box information appears to be a world wide web (WWW) transaction. In particular, the black box information may be preferably formatted like a web page transaction so that the black box information may pass through any firewalls without a problem. Now, more details of the portion of the system residing on the client computer will be described.

Figure 4:
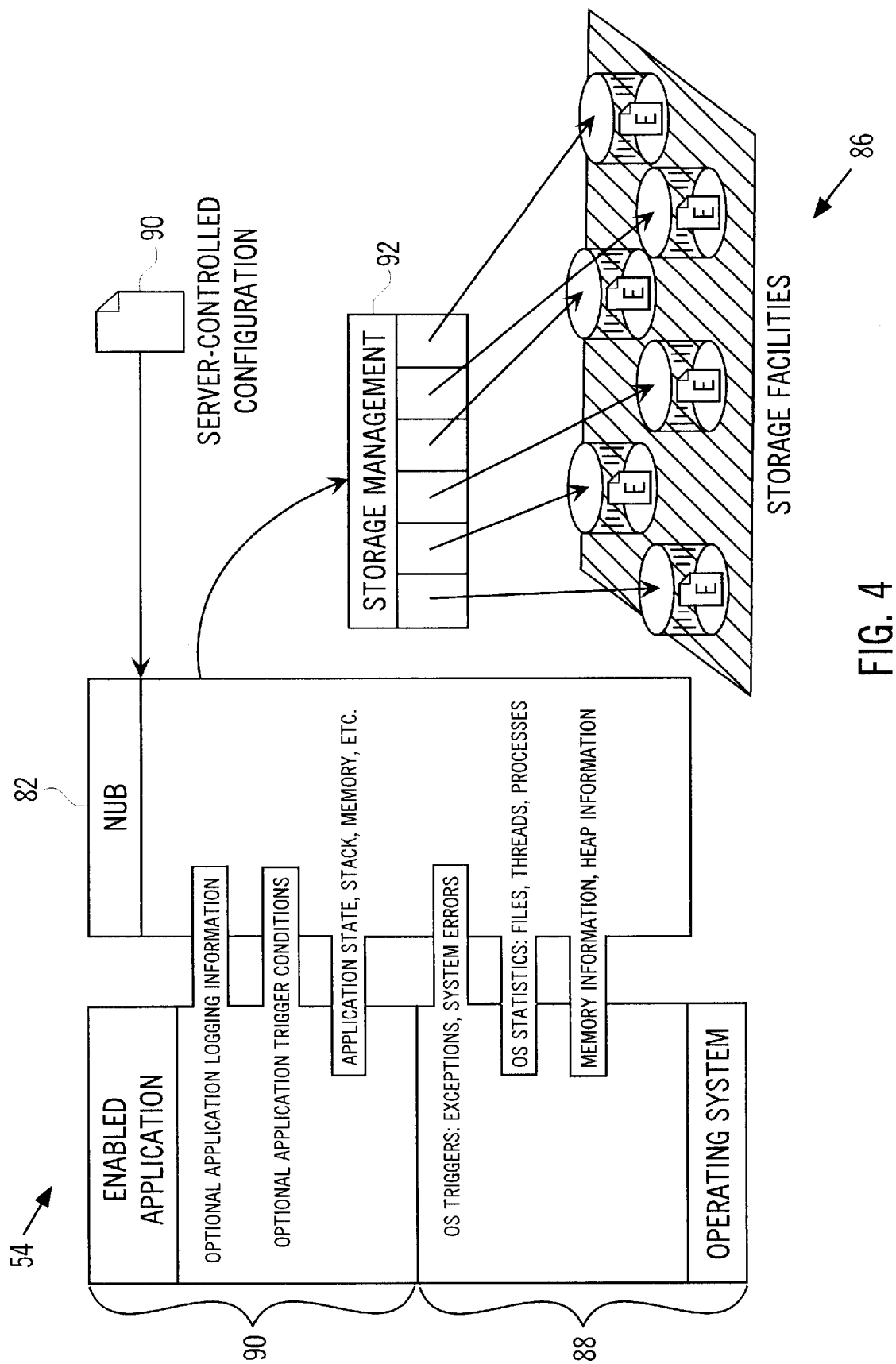
FIG. 4 is a block diagram illustrating more details of the client nub application of FIG. 3.

FIG. 4 is a block diagram illustrating more details of the client computer 54 and in particular the client nub 82, a server controlled configuration file 90, and the storage manager 92. The storage manager was described above and will not be described here. As shown, the nub 82, the operating system 88 and the software application 90 may be tightly coupled together so that the nub may gather information from the operating system and the software application. As shown, the nub may have access to the application state, the memory stack and the memory state from the software application. The nub may also have access to the operating system statistics, threads, processes, memory information and heap information from the operating system. In addition, the operating system may also provide operating system triggers, exceptions and system errors to the nub. The software application may, optionally, provide information about the use of the software application and application trigger conditions. Thus, the client nub is tightly coupled to the client computer.

The client nub 82 is also reconfigurable in that a server-controlled configuration file 90 may be transmitted to the client nub by the server during a communications session. The configuration file may, for example, instruct the client nub to start gathering information about a particular variable value of interest to the developer. Once the developer has gathered sufficient information about that particular variable, another configuration file may instruct the client nub to stop gathering information about that variable. Thus, the information gathered by the client nub may be customized and constantly changed as the needs of the developer or the operator of the system changes. Now, more details about the transceiver portion of the system will be described.

Figure 5:
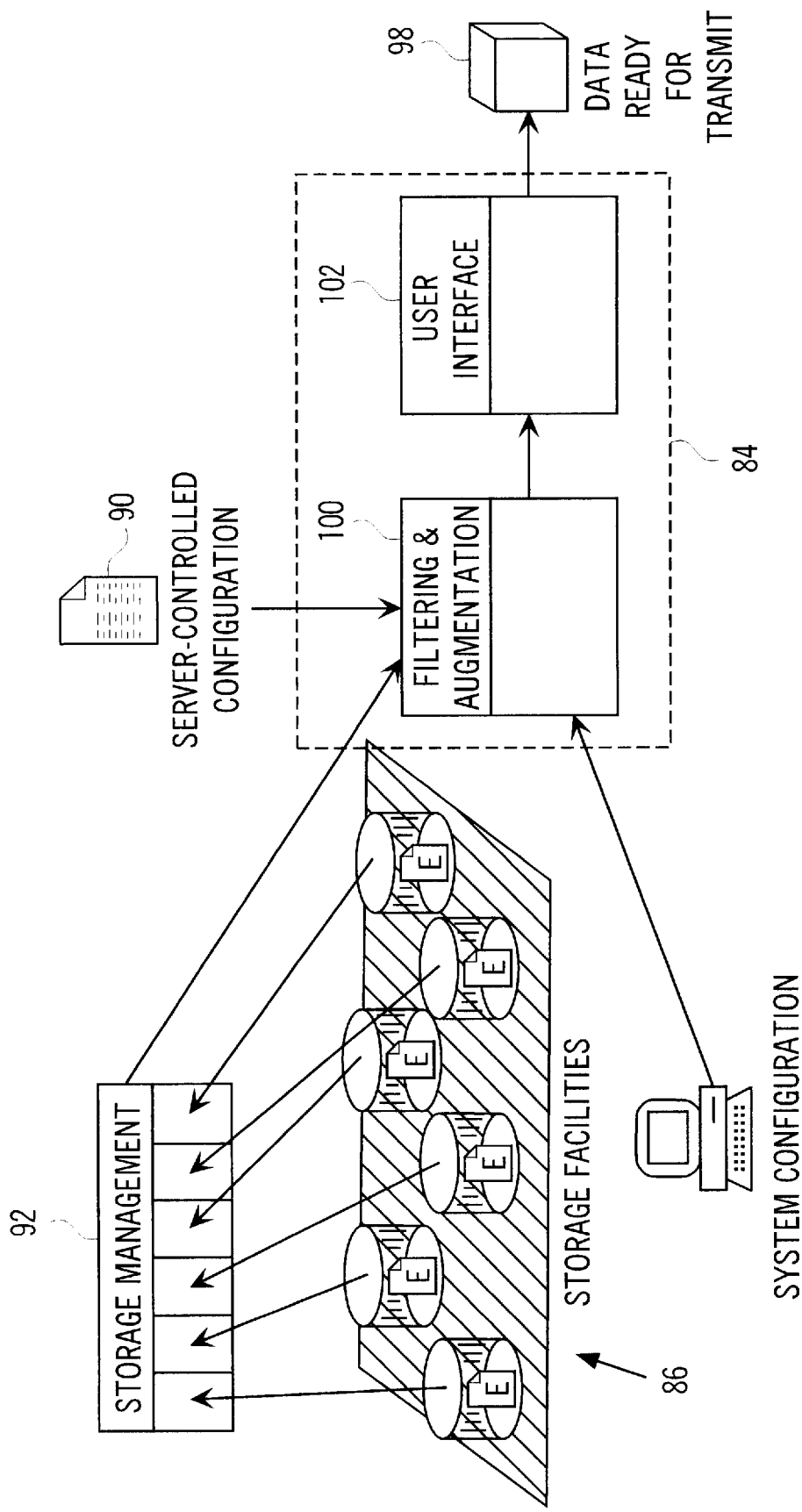
FIG. 5 is a block diagram illustrating more details of the client transceiver of FIG. 3.

FIG. 5 is a block diagram illustrating the details of the transceiver 84 shown in FIG. 3. The storage manager 92, the black box storage facilities 86 and the server configuration file 90 are shown for reference purposes and will not be described here. Thus, once the information has been gathered by the client nub 82, shown in FIG. 4, the transceiver 84 may perform several functions once a triggering event occurs and generate a black box 98 that is sent to the server. An example of the black box will be described below with reference to FIG. 9. In particular, the transceiver may include a filtering and augmentation portion 100 and a user interface portion 102. The filtering and augmentation portion 100 determines whether or not to send the accumulated black box information back to the server based on a plurality of developer defined filters. The language in which the filters that run on the server and the transceiver are written are similar so that some filters that normally operate on the server, such as filters that do not require information that only the server has access to, may also operate on the transceiver. The filters may determine if the black box information gathered is information about a known bug or problem that has already been fixed so that the developer no longer is interested in that particular information. For example, if the developer has already fixed a bug that caused a NIL pointer ASSERT to be used, the filter may remove any information from the black box about the ASSERT. Another filter may be a random filter that discards a predetermined portion of the black box information in order to reduce the amount of data being received by the server. Another filter may instruct the black box to be sent to the server immediately when a predetermined hard-to-reproduce error or intermittent bug occurs. Still another filter may recognize a particular trigger event and discard the black box completely so no transmission to the server occurs. If the transceiver determines that the black box information is of interest to the server, the user interface portion 102 of the transceiver may optionally present a user interface (UI) to the user of the client computer requesting authorization to transfer the black box information to the server. The black box information 98 is then transmitted to the server.

To transmit the black box to the server, a plurality of different transfer protocols may be utilized. As described above, for a client computer attached to the web, the HTTP protocol may be used. For a remote computer-based system, such as a vending machine, the transceiver may send the data via a direct modem connection or via a serial port to a small modem module that transmits the data to the server. Now, the transmission of the black box to the server will be described in more detail.

Figure 6:
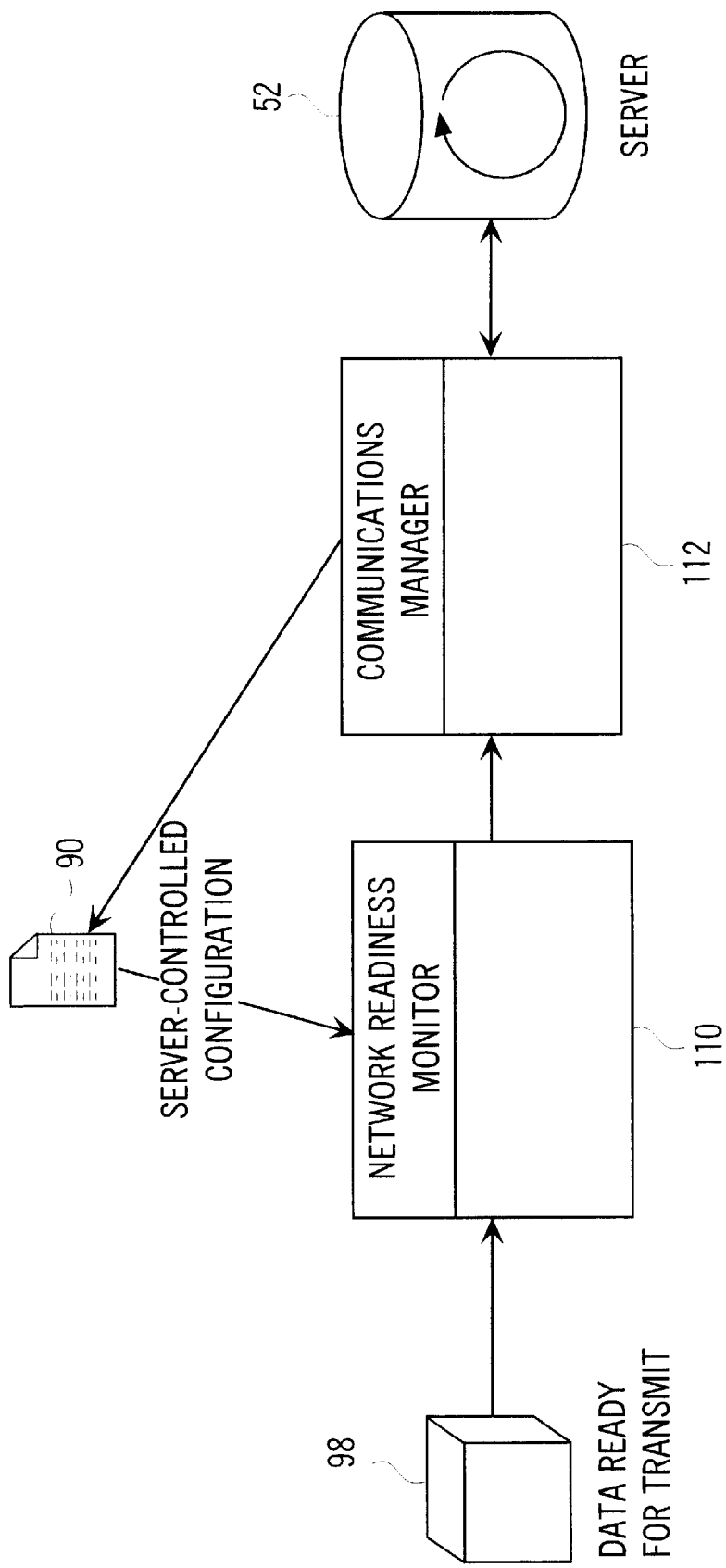
FIG. 6 is a block diagram illustrating more details about the transmission of a black box in accordance with the invention.

FIG. 6 is a block diagram illustrating the transmission of the black box 98 from the transceiver of the client computer (not shown) to the server 52 in accordance with the invention. During the transmission of the black box 98 to the server, it may pass through a network readiness monitor 110 and a communications manager 112. The network readiness monitor determines when the communications network may be used to communicate the black box data to the server. For example, as described above, the transceiver may delay transmission of the black box information until the client computer has initiated some other communications so that the system in accordance with the invention operates transparently to the user. For a client computer connected to, for example, a local area network or an intranet, the black box transmission may occur at any time since the client computer is often communicating with the network. The operation of the network readiness monitor 110 may be customized or changed based on instructions contained in the server-controlled configuration 90. For example, the server-controlled configuration may specify to which target server the black box will be communicated and to monitor whether the server is ready and can receive more black boxes. The communications manager 112 interacts with the network readiness manager 110 and the server 52 to control the communication of information and data between the client computer and the server. For example, the communications manager may receive the server-controlled configuration file 90 in order to change the operation of the network readiness monitor 110, the transceiver 84 shown in FIG. 3 and the nub 82 shown in FIG. 3. The communications manager may send the black box information via, for example, the HTTP protocol so that the black box information appears to be normal web traffic so that the black box information is not stopped by a firewall. Now, the protocol between the server and the transceiver will be described.

Figure 7:
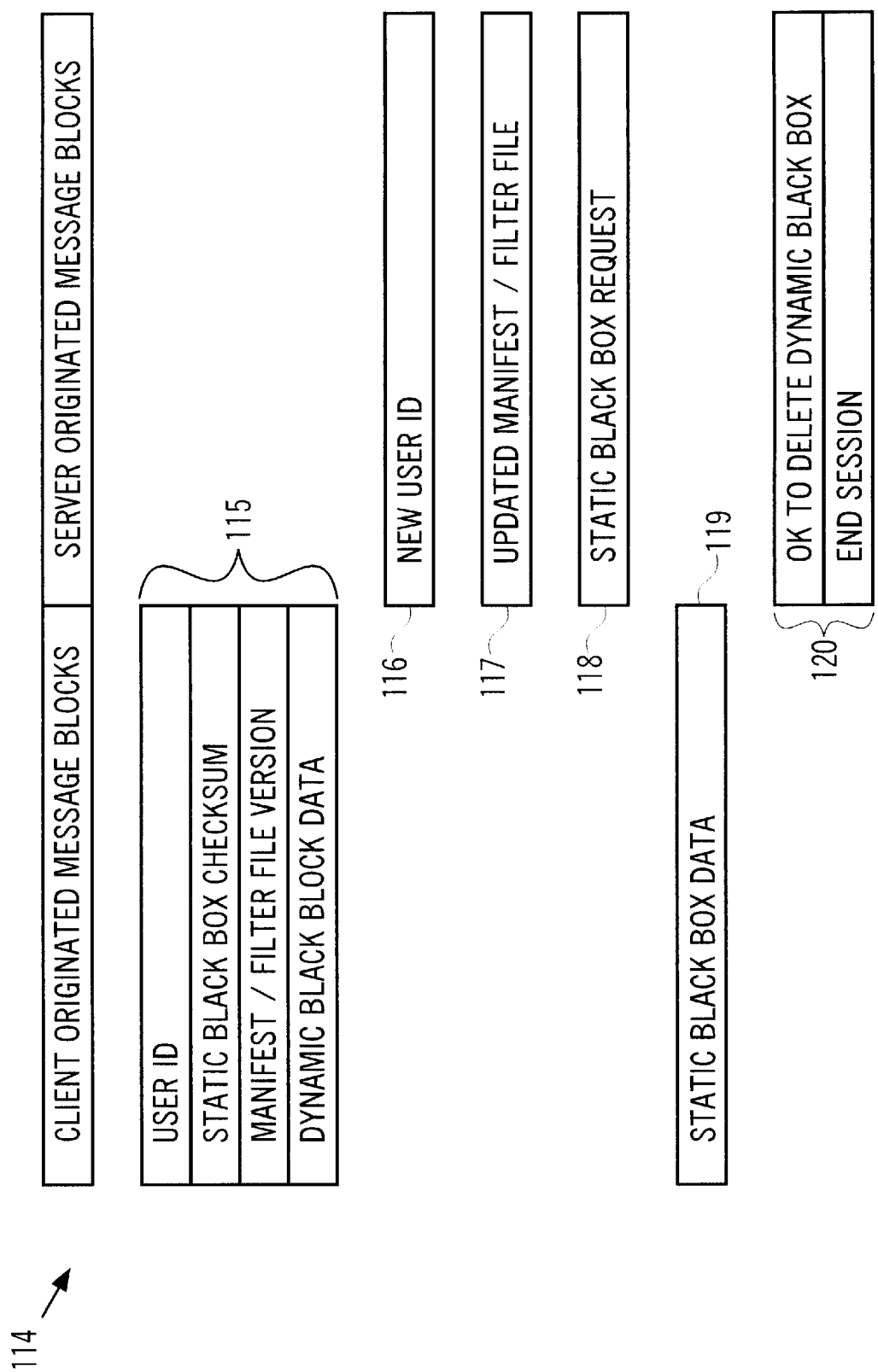
FIG. 7 is a diagram illustrating an example of the communications protocol between the transceiver and the server.

FIG. 7 is a diagram of an example of a communications protocol 114 that may be used between the transceiver and the server. During the transmission of black box data between the transceiver and the server, the server receives several blocks of data 115. These blocks may include a client identification block, a static black box checksum, a manifest/filter file version value and any dynamic black box data. If a given client computer has not previously connected to the server, the server generates and transmits a new user ID 116 back to the client computer. The client computer then attaches this user ID to any future black box information sent to the server. The server uses the user ID to associate static information with a particular client machine and to keep a record about a particular user. For example, a user profile may be generated over time and used, for example, to gather usage data, do metered billing or target users for marketing campaigns.

The server uses the static black box checksum to determine if the static black box information currently stored by the server matches the client machine's current configuration. If the static information does not match, the server requests an updated static black box data 119 from the client machine. The server uses the manifest/filter file version value received to determine if the transceiver of the client machine has the current version of the filter so that the server may update the filter as necessary.

The server then stores the dynamic black box data into a flat file storage 124 (see FIG. 8) tagged with the user ID for later processing by a digester process 126 (see FIG. 8). If new static data is needed from the client machine, any altered static data is tagged with the user ID (so it can be associated with the dynamic data) and transmitted to the server. Once storage has occurred, the server sends a message 120 to the client machine instructing it to delete its locally stored copy of the dynamic black box and to end the communications session. Now, the details of the server 52 in accordance with the invention will be described.

Figure 8:
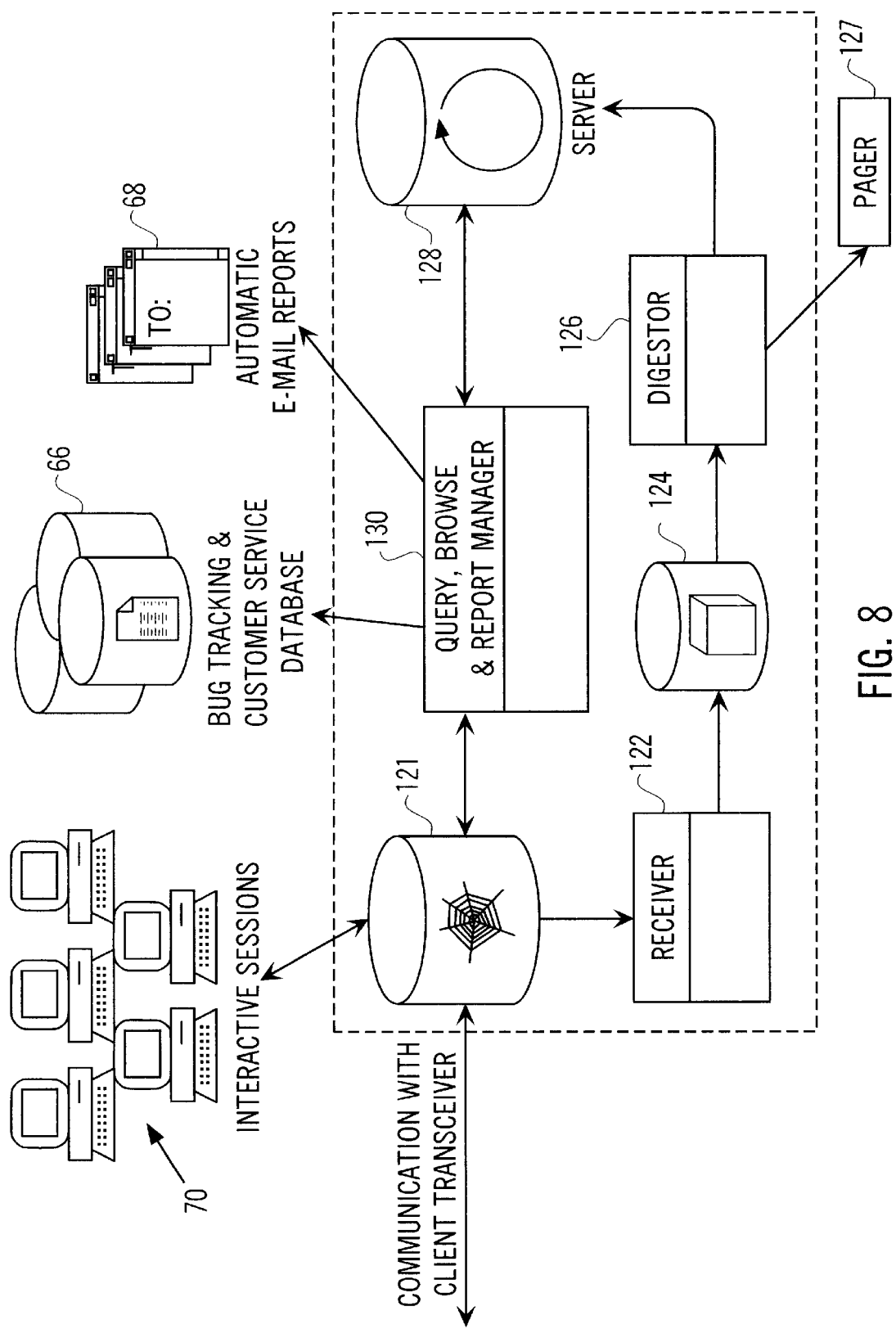
FIG. 8 is a block diagram illustrating more details of the server computer of FIG. 2.

FIG. 8 is a block diagram illustrating the server 52 of the system in accordance with the invention. In addition to exporting data to existing bug tracking and customer service databases 66, the server has the automatic E-mail system 68 and the query tools 70, as described above, and may also include a web server 121, a black box receiver 122, an undigested black box storage system 124, a black box digester 126, a server 128, and a query, browse and re p ort manager 130. The web server 121 is an example of how a client's black box information is received by the server (i.e., using the HTTP protocol), but the black boxes may also be received via other communications means. The web server in the HTTP protocol may also permit the developer to access data stored in the server with web-based browse/query tools. With other communications means, other tools to access the data in the server may be used.

Each of the portions of the server 52 will now be described in more detail by describing the movement of black box information from a single client computer through the server via the HTTP protocol. The server, in accordance with the invention, however, can handle receiving multiple black boxes from the plurality of computer-based systems that ar e connected to the server. The black box receiver 122 of the server 52 receives the black box information and stores the black box in the black box storage 124 that may be a flat file The black box is thus stored in undigested, raw form in the flat file in order to increase the overall speed at which black boxes may be received. The black boxes may then be processed and digested by the black box digester 126.

The black box digester may be a software application being executed by the server. The digester reads the flat file containing the undigested black box information and processes the black boxes one at a time. The digester may include a plurality of processes that parse through the black boxes to pick out certain information in the black boxes and generate derivative data that may be added to the black box. Each of the deriver routines may generate derivative information either from the undigested black box information or from information that has already been derived by other deriver routines. The deriver routines may be executed in an iterative manner (i.e., repeatedly) until all of the deriver routines in the digester 126 are no longer able to generate any additional derivative information. The developer or operator of the system may also write deriver routines to add higher level information to the digested black box. For example, one deriver routine may convert the program counter (PC) location to a source file name and line number so that application-specific information may be converted into a higher level format (i.e., what line of the application source code is causing an error). A plurality of keys and a value for each key are generated from the black box as described below with reference to FIG. 9. Once all of the derivative information has been generated, the black box information is then sent to a recognizer module within the digester 126.

The recognizer may include a plurality of rules and each rule may identify a particular value of a variable or a condition in the black box information and then, if the value or condition exists, the rule may cause some action to be performed. For example, a particular rule may determine if the current operating system version on the client computer is NT 4.0 or later and, if the system version is not NT 4.0 or later, the system may generate an automatic E-mail message to the client computer indicating that version 4.0 or later of NT is required. Each rule in the recognizer may be tested sequentially and any actions taken. The system or the operator may add new rules, modify rules or delete rules so that the recognizer is customizable. The system may also automatically generate new rules in response to data located within a black box. With these rules, the system may automatically and proactively generate customer support messages, such as by e-mail or a pager 127, without having the user of the client computer actually having the problem.

The storage of the digested black box information in the database 128 may be accomplished in a plurality of different manners. In one embodiment of the invention, an SQL database may be used to store the digested black box information. Once the digested black box information has been stored in the database 128, the information may be used in a plurality of different manners. In particular, the report manager 130 generates reports from the database information on a periodic basis. For example, the system administrator may configure the report manager to send a breakdown report, arranged by client computer operating system, of all black boxes that contain information about a system crash condition that were received in the last 24 hours. The report manager generates these reports by interrogating or querying the database 128 for records that fit a particular description and then generates a report in any format.

The system may also automatically export any data or information about a software bug to the bug tracking and customer service database 66. The bug tracking and customer service database may be a bug tracking database that is already being used by the developer and the system in accordance with the invention merely exports data to that existing bug tracking database. The bug database is typically used to assign particular software bugs to a particular engineer to solve, and then track the bug through its life from discovery to the solution. The exporting of the black box data to the bug database makes it easier for a developer to integrate the system in accordance with the invention into their existing bug tracking systems. Any users of the system may also browse and interact with the system using the interactive sessions 70 via, for example, a web browser that connects to the query. The system may permit the developer to query the database 128 and generate reports in addition to viewing the contents of an individual black box. Thus, an engineer trying to fix a software bug may interact directly with the various information gathered by the client nub in order to fix the software bug. In addition, the engineer may modify the configuration file and the server will reconfigure the data gathered by the client nub by communicating the configuration file to the client nub.

The system may also include correlation tools that permit a user of the system to identify similarities in any bug reports generated by the system. For example, the engineer may want to look at all black boxes which contain a trigger caused by an ASSERT command. For the set of black boxes that contain this information, the correlation tools may identify similarities among this set of black boxes. The correlation tools may also detect a pattern within the black boxes and then automatically reconfigure the information gathered by the client nubs in response to the detection of the pattern. These correlation tools make it easier for the engineer to identify problems that are caused by a particular configuration.

The server may also include tools that permit the server to process the output generated from the build process for a particular software application in order to automatically map low level client computer information, such as the program counter value, the module list and the load addresses for the particular software application back to source file level information such as the source file name and the line number in the source file. This may be done automatically for various parameters and values in the in the black box where the server has more information, such as the build output, about the triggering event than the client nub. For example, the processor register values may be mapped back to variable names and the stack traces may be mapped back to function names and parameters.

When the system in accordance with the invention is used by a developer in a customer support environment, the system may have a few additional features. In particular, there may be a mechanism to permit a specific customer to send his black box data to a particular engineer. For example, the customer may be given a unique black box identification number so that black boxes with those identification numbers are all sent to the same engineer. The mechanism may also be implemented by the customer tagging each black box generated with his E-mail address or any other information that may be used to uniquely identify the black box. Another additional feature in the customer support environment may be a knowledge base which identifies specific patterns in any black box data (similar to the recognizers in the engineering environment) to identify common problems and bring those common problems to the attention of the support engineer even before a user is actually having a problem or to help diagnose a particular problem of a user that is currently calling the support engineer. Now, a example of the storage of the black box data will be described.

Figure 9:
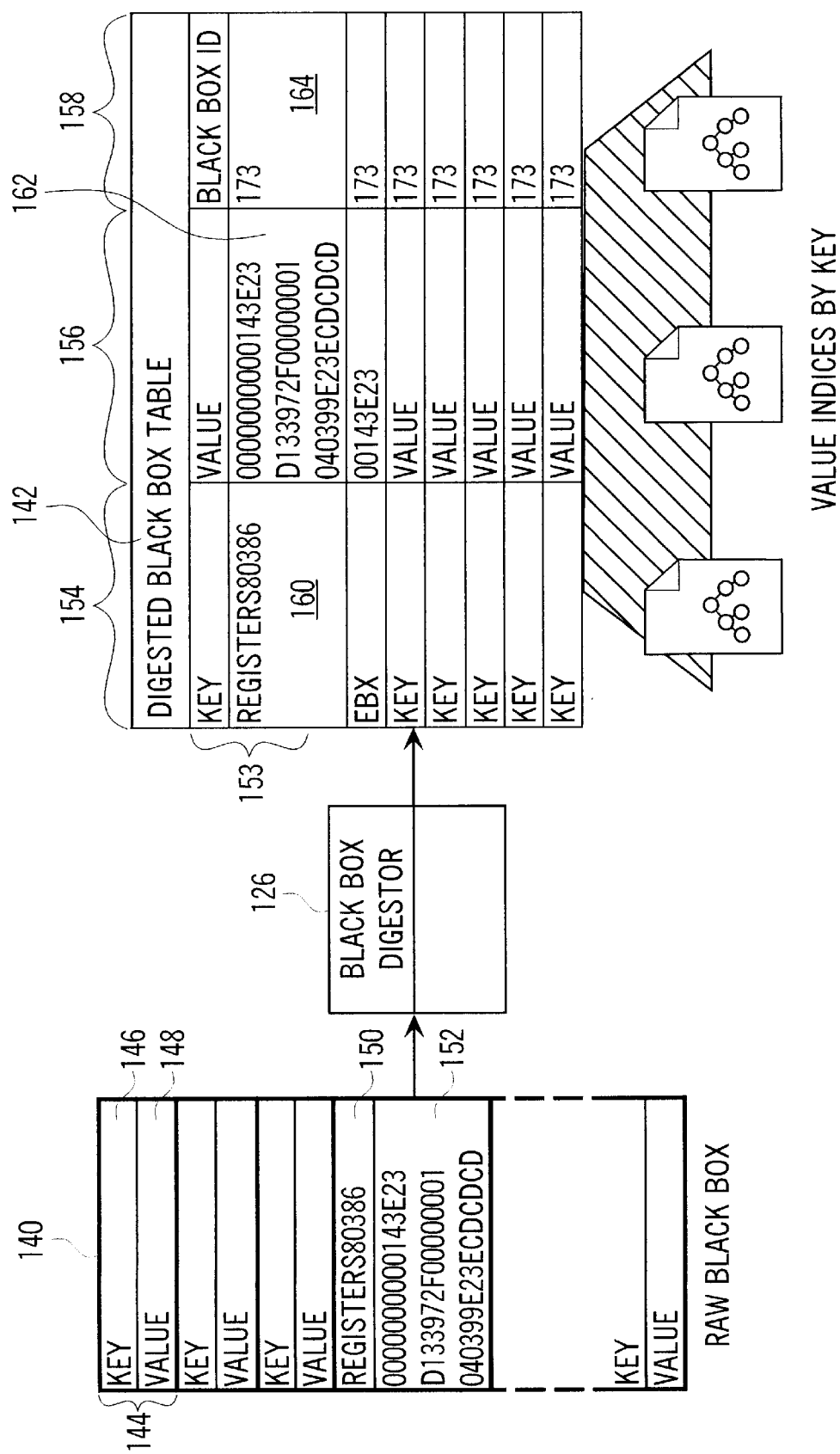
FIG. 9 is a block diagram illustrating more details about the black box storage system of FIG. 8.

FIG. 9 is a block diagram illustrating an undigested black box 140 and a digested black box 142 after it has been processed by the digester 126 in accordance with the invention. As shown, the undigested black box may include a plurality of records 144 and each record may include a key field 146 and a value field 148. The key field may contain the name of the variable or register being analyzed and the value field may contain the value of that variable or register. For example a key field 150 contains "Registers80386", and a corresponding value field 152 contains the value of those processor registers. The digested black box 142 may include a plurality of records 153 and each record may include a key field 154, a value field 156 and a black box ID field 158. Thus, for the key field 150 and the value field 152, the digested black box may contain a corresponding key field 160, a corresponding value field 162 and a black box ID field 164 that identifies the record as belonging to the particular black box. The records in the digested black box may then be organized in a various ways in the database of the system.

The storage of these keys and values permit selection of all key/value pairs associated with a black box identification as well as the selection of arbitrary values across a set of black box identifications. In addition, arbitrary queries may be generated. For example, assuming the data repository contains key/value pairs that correspond to a date and time a black box was submitted and also contains key/value pairs that correspond to a source file (network.c) in which a crash occurred. A query for all black boxes that crashed in the source file network.c in the last month is answered by constructing a table of black boxes from the last month and a table of black boxes with crashes in network.c and returning the intersection of these two tables to the user. Now, a second embodiment of the invention that remotely monitors a central processing unit will be described.

Figure 10:
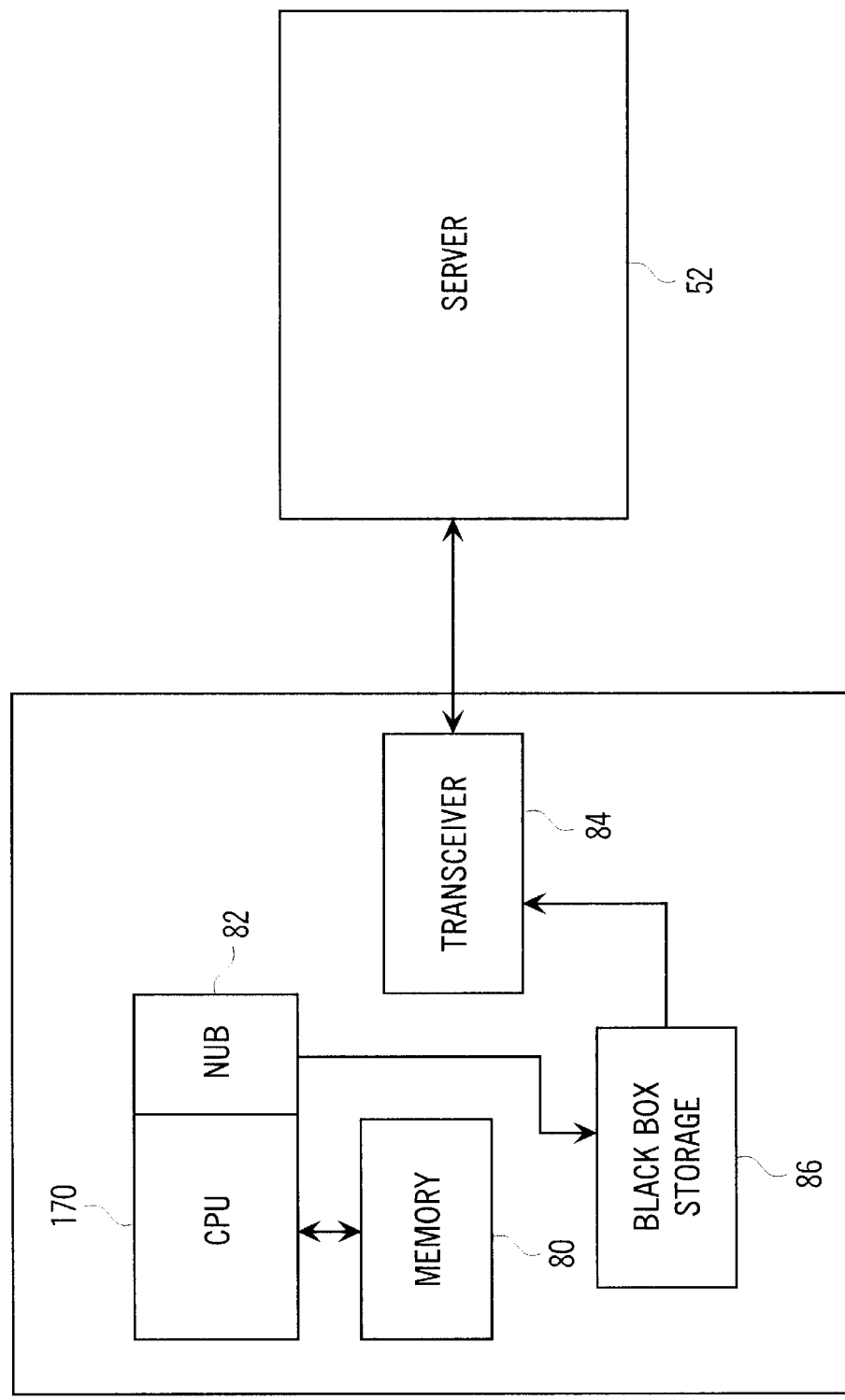
FIG. 10 is a block diagram illustrating a second embodiment of a system and method for remotely monitoring a plurality of computer-based systems in accordance with the invention.

FIG. 10 is a block diagram illustrating a second embodiment of the system in accordance with the invention that may be used for remotely monitoring the data and address fetches of a central processing unit (CPU) 170 within a client computer 54. Other portions of the system in accordance with the invention, such as the black box storage 86, the transceiver 84 and the server 52 operate in a similar manner as described above with respect to the first embodiment and they will not be described here. In this embodiment, the client nub 82 is integrally associated with the CPU and stored in some memory within the CPU, similar to well known integrated circuit emulator (ICE) circuits so that the client nub may gather information about the CPU at any time. The nub may store information, such as the last predetermined number of addresses from which the CPU has executed instructions and the last predetermined numbers of data accesses and values the CPU retrieved. A mechanism may be provided to turn on and off the nub. Thus, with this embodiment of the invention, when a processor exception occurs, the operator of the system in accordance with the invention may view a history of the CPU's address and data accesses prior to the exception. Thus, the nub may gather history information about a CPU exception from each of a plurality of computer-based system so a developer of the CPU can locate the cause of the exception and fix it.

In addition, since the client nub may be reconfigured by the server, the developer of the CPU may elect to gather information, for example, about the usage of the cache memory within the CPU and the client nub gathers that information and then communicates that information to the server when a trigger condition occurs, as described above. Thus, the system in accordance with the invention may be used to remotely monitor the CPUs of a plurality of client computers so that the developer of the CPU can solve any CPU faults located and problem solve any bugs noted by a customer. Now, the operation of the client nub in accordance with the invention will be described.

Figure 11A:
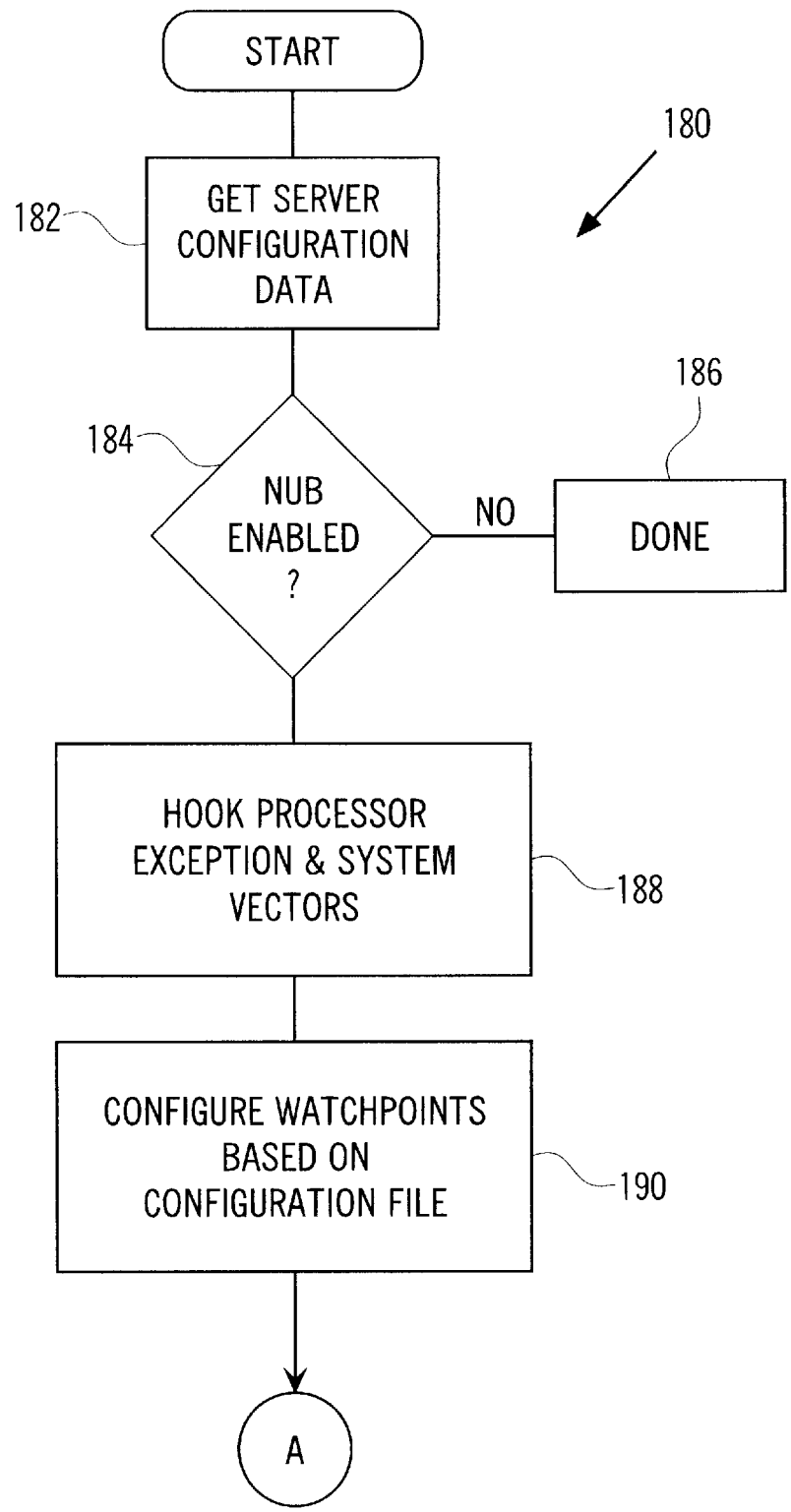
FIGS. 11A and 11B are a flowchart illustrating the operation of the client nub in accordance with the invention.
Figure 11B:
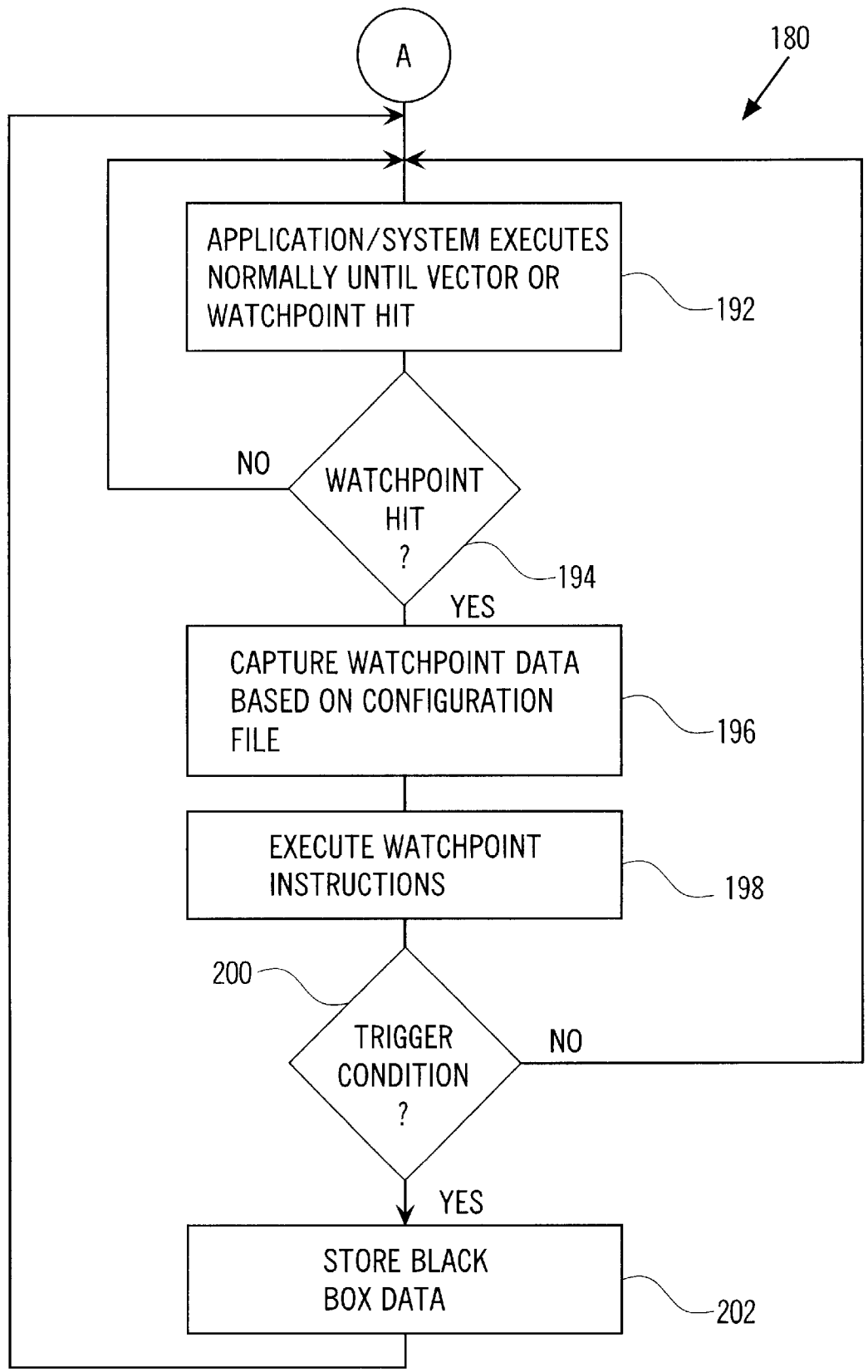

FIGS. 11A and 11B are flowcharts illustrating a method 180 of operation of the client nub in accordance with the invention. In step 182, the client nub on the client computer retrieves the server configuration file to determine what information the client nub is going to be gathering. Next, the system determines whether the client nub is enabled in step 184 and if the nub is not enabled, the method is completed at step 186. The client nub may be disabled by the user of the client computer or the developer. If the client nub is enabled, then in step 188, the client nub hooks into and gains access to the processor exception vectors and the system vectors. Next, in step 190, the client nub sets its watchpoints (i.e., points at which the client nub will gather information) based on the configuration file. The operator of the server may see an interface that shows the name of the routines within the software application so that the operator may select routines in which the operator would like to gather information. For example, the operator may gather information about how many times a user enters a print routine. In step 192, the software application and client computer operating system runs in a normal manner until an exception vector is generated or a watchpoint set by the client nub is encountered. The system, in step 194, then determines if a watchpoint has been encountered and performs operations, such as capturing based on the configuration file in step 196. Thus, the client nub generates information about the watchpoint. If a watchpoint was not encountered, the system returns to step 192.

Then, in step 200, the system determines whether a trigger condition has occurred. If a trigger condition has not occurred, then the method loops back to step 192 and normal operation of the system and software application continues until the next watchpoint or exception vector is detected. If the trigger condition has occurred, as defined by the configuration file, the system stores the black box information using the storage facilities in step 202 and then the method returns to step 192 and the client nub waits for another watchpoint to be encountered. The black box information will include a record with information about the watchpoint that was set based on the watchpoint instruction in the configuration file.

A watchpoint may permit a breakpoint to be remotely set, may permit data to be gathered remotely, and may provide a way to remotely gather information about a software application which is not client nub enabled. Thus, even for software applications which do not have the client nub embedded within the software application, the system may gather information about that software application. In fact, the information about the software application is gathered and stored locally (i.e., on the client computer) and then communicated to the server whenever a communications link exists, as described above. For example, a laptop computer which is not connected to a network may gather information and then once the laptop computer is connected back to the computer network, the black box gathered while the laptop computer was not connected to the network may be transmitted to the server.

There are numerous types of watchpoints that may be set by the server in accordance with the invention. Several examples of a watchpoint are now described briefly, but it should be noted that the invention is not limited to any particular type of watchpoint. A watchpoint may be used, for example, to generate usage or coverage information, such as to monitor the usage of a routine in a software application. A watchpoint may also be used to monitor performance information such as how fast a portion of a software application is being executed. This may be accomplished, for example, by setting two watchpoints at predetermined locations in the software application and then measuring the elapsed time it takes for the software application to pass through the two watchpoints. Another type of watchpoint may be used to gather other critical data such as the value of a variable at a given point in the software application. A watchpoint may also be used to change a data value or execute a small software application in order to, for example, fix a software bug.

A watchpoint may also be used to register a piece of memory that the developer may want to collect at the time of a triggering event. For example, the developer may want to know the values of the software application's global variables after a software crash. Thus, a watchpoint may be set at the instruction that allocates the global storage and register the memory that is allocated. Then, when a triggering event occurs, the nub collects all of the data from the registered memory blocks.

A watchpoint may also act as a counter and count the number of times that a software application executes a particular instruction or piece of code. These counters may be implemented as counter collection classes that may have numerous different characteristics. For example, when a programmer creates a counter collection class, a counter lifetime is indicated. The counter lifetime characteristic may be that the counter is reset each time the software application is launched, it may be reset each time a black box from the particular computer-based system is uploaded, or it may never be cleared. For every counter class, there may be an optional clear call that permits the software application to clear the counter and a call which permits the software application to increment the counter. The clear on launch counters and the never clear counters may be easily implemented. Counters which are reset when a black box is uploaded requires synchronization between the counter store and the software application to ensure that the counter is reset at the appropriate time. This synchronization may be implemented using a mutex to determine the ownership of the counter, reconciling the software application counter value with the counter store as predetermined times, such as when the application is terminated, or sending notification to the application that the black box has been successfully uploaded so that the application or the nub resets the counter. The invention, however, is not limited to the several examples of counter collections classes described below. Now, the operation of the transceiver will be described.

Figure 12A:
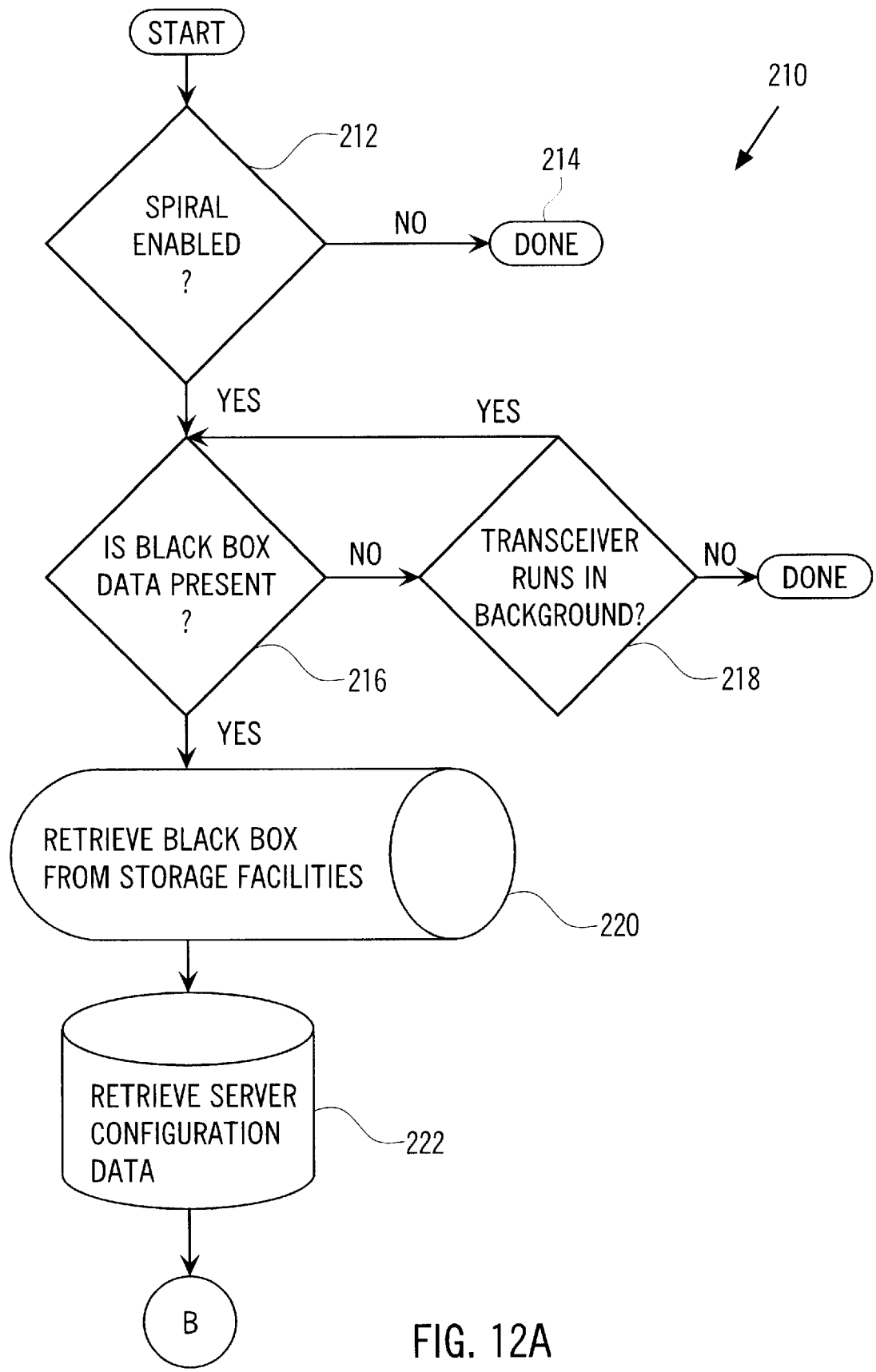
FIG. 12 is a flowchart illustrating a portion of the operation of the transceiver, as shown in FIG. 5, in accordance with the invention.
Figure 12B:
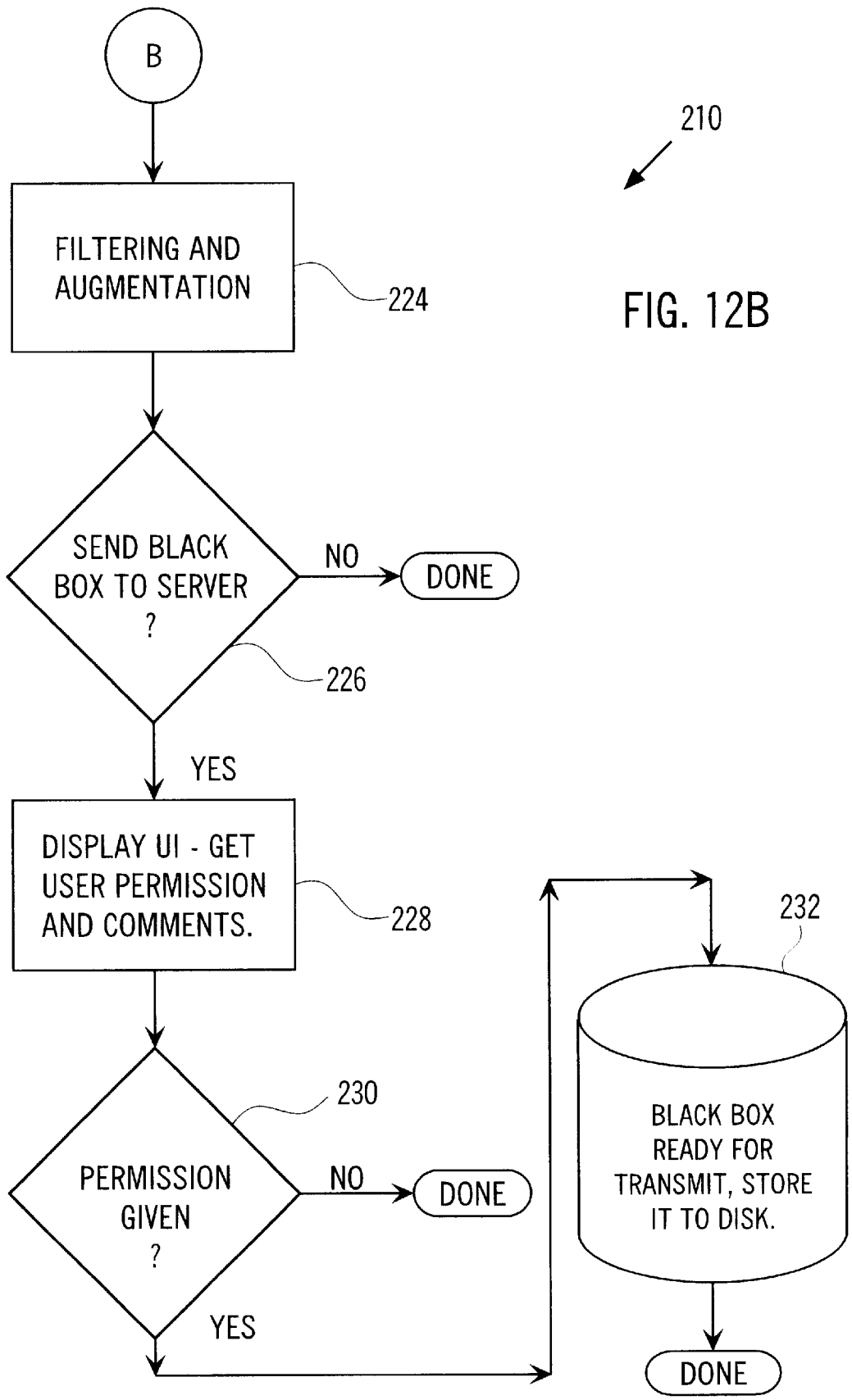

FIG. 12 is a flowchart illustrating a method 210 of operation of the transceiver in accordance with the invention. The transceiver may be launched in several ways including when the client computer operating system starts or when a particular software application starts. In step 212, the system determines if the transceiver is enabled since the transceiver may be disabled by the user of the client computer or by the developer due to an instruction contained in the configuration file. If the transceiver is disabled, the method is completed in step 214. Next, in step 216, the transceiver determines whether there is any black box data present by using the storage manager. As described above, the black box data may be stored on the disk, in RAM, in VRAM or in an external device by the storage manager based on the available resources of the client computer at the time the black box data is stored. Some of the stored data may be corrupted, but the storage manager may perform some known error correction methods in order to piece together some valid black box data. If there is not any black box data, the transceiver may continue to run in the background and wait for some black box data to be generated in step 218. If there is some black box data, the transceiver, in step 220, retrieves the black box data from the storage facilities. Next, in step 222, the transceiver retrieves the server configuration file that may be stored separately on the hard disk of the client computer and contains parameters that control the operation of the client nub and the transceiver. Next, in step 224, based on the configuration data, the transceiver may filter and augment the black box data. During filtering, the transceiver may determine whether or not the particular black box data is going to be sent to the server based on the current information requested by the server. During augmentation, the transceiver may add system configuration information, such as the operating system version or the amount of RAM that is available, into the black box. The transceiver then determines in step 226, based on the filtering criteria in the configuration file, whether to send the black box to the server and the method is completed if the black box is not going to be sent to the server. If it is determined that the black box data is going to be communicated to the server, in step 228, a user interface is displayed which asks the user of the client computer permission to transmit the black box information to the server. The user interface may also permit the user of the client computer to add comments to the black box data. Next, the transceiver determines if it has been authorized to transmit the black box data in step 230 and in step 232, the black box is prepared for transmission (i.e., formatted) and stored on the disk until an appropriate time to communicate the black box information occurs. Now, the operation of the server controlled watchpoints will be described.

Figure 13:
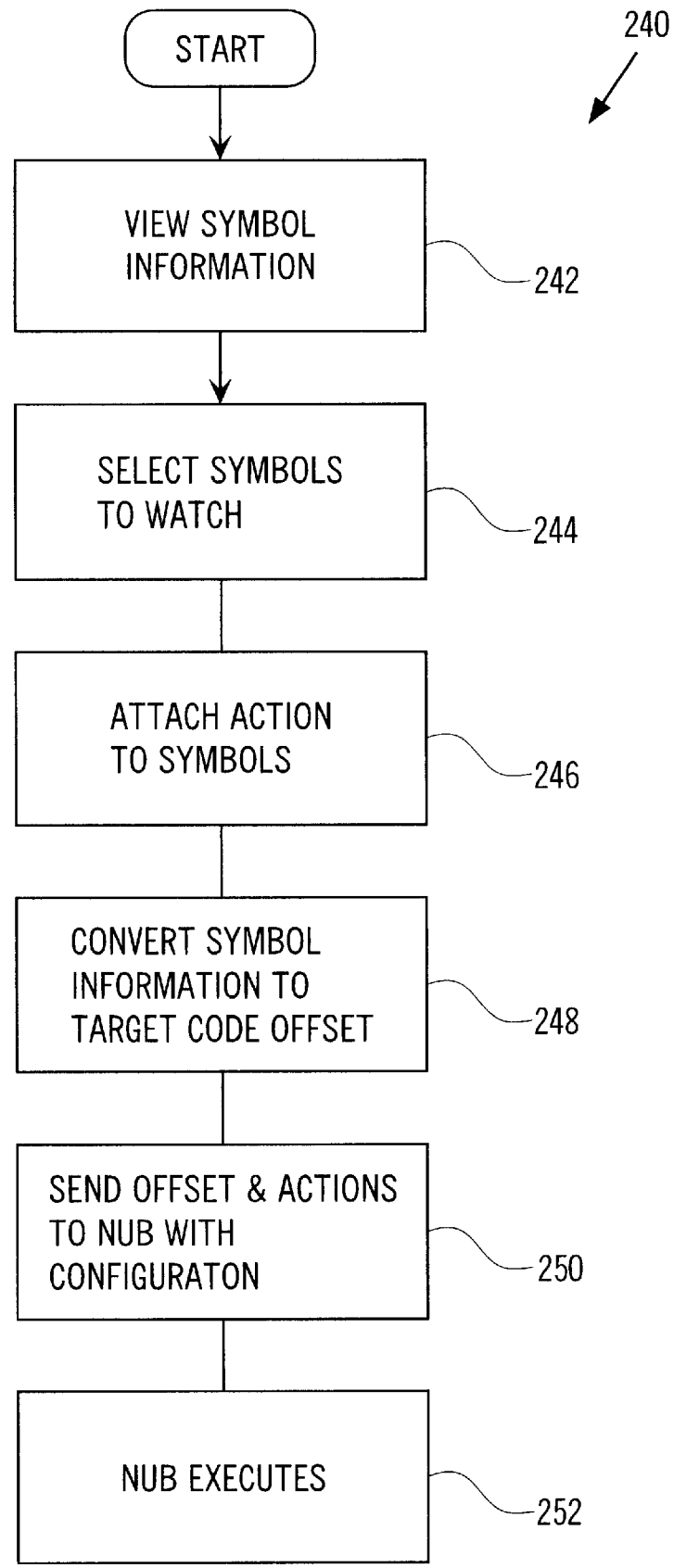
FIG. 13 is a flowchart illustrating a method for generating server controlled watchpoints in accordance with the invention.

FIG. 13 is a flowchart illustrating a method 240 of generating the server controlled watchpoints in accordance with the invention. In step 242, the software application developer who is operating the server, views the symbol information from a particular software application and, in step 244, selects the symbols that are of interest to the developer. In step 246, the developer attaches an action to each symbol and in step 248, the system automatically converts the symbol information into target code offset information. Next, in step 250, the offsets and the actions are transmitted to the client nub as part of the server-controlled configuration file. Then, in step 252, the client nub begins its operation as described above with reference to FIG. 10.

Figure 14:
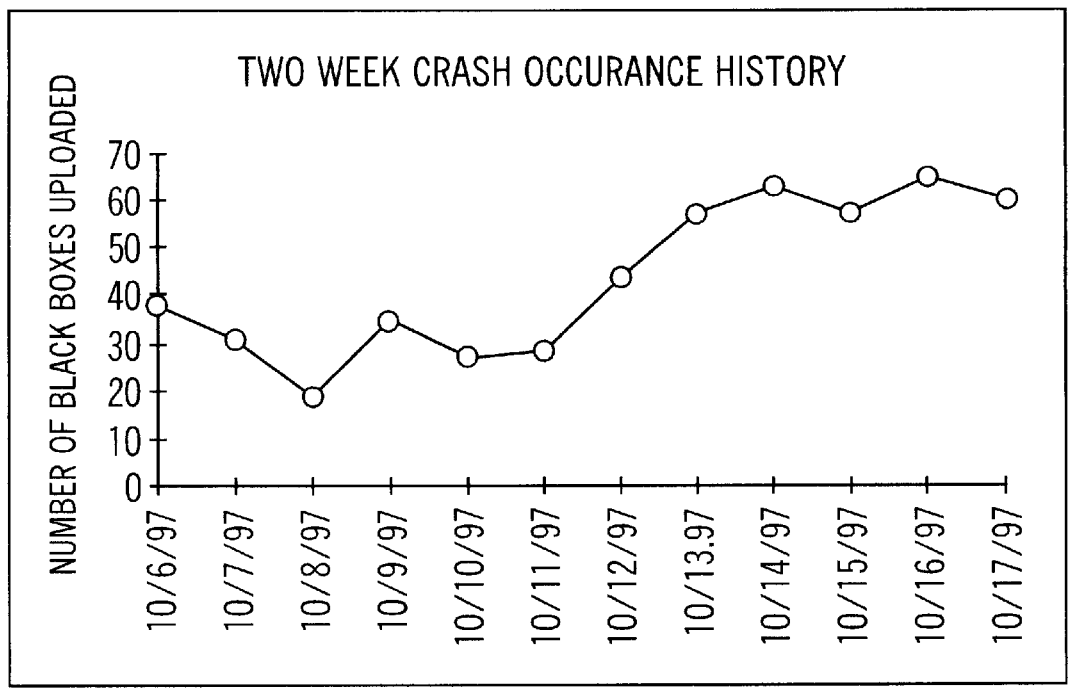
FIG. 14 is a first example of the output from the remote monitoring system in accordance with the invention.
Figure 15:
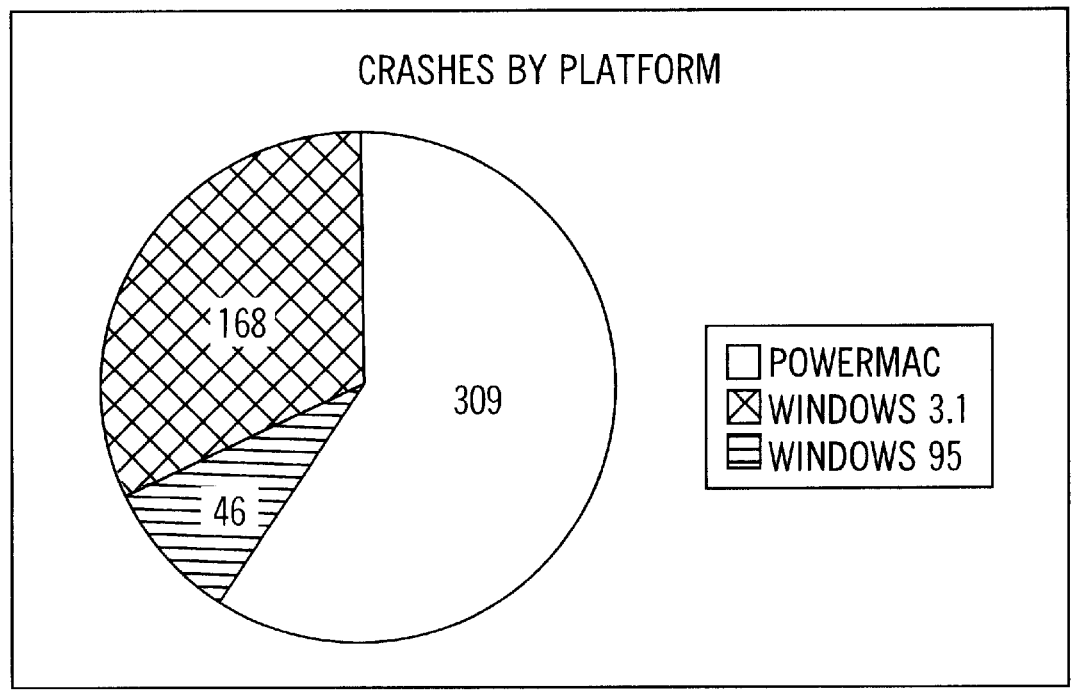
FIG. 15 is a second example of the output from the remote monitoring system in accordance with the invention.
Figure 16:
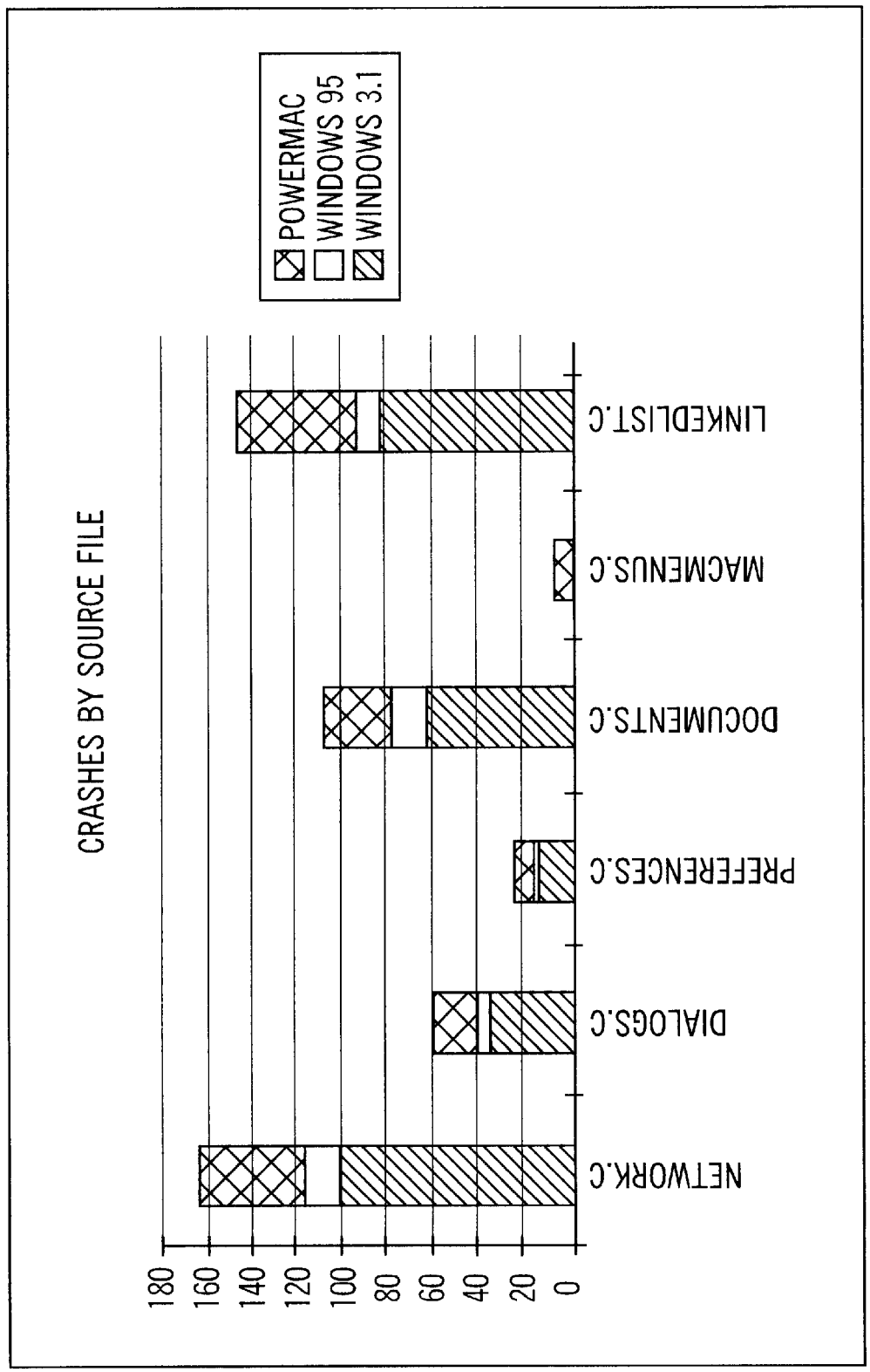
FIG. 16 is a third example of the output from the remote monitoring system in accordance with the invention.

FIGS. 14–16 show examples of reports that may be generated by the server based on black box data from a plurality of client computers. For example, FIG. 14 is a graph showing a number of black boxes with crash information sent to the server over a two week period. The graph shows that the number of crashes has increased recently. FIG. 15 is a pie graph showing the number of crashes by operating system type for a particular software application. This pie graph indicates that the Windows 3.1 version of the software application crashes the most. FIG. 15 is a graph showing the number of crashes for each source file for each operating system. Thus, the system may generate various reports about the client computers or the software applications being executed by the client computers.

Now, an example of a black box generated in accordance with the invention will be described.

BLACK BOX EXAMPLE

<New Incident Report>    Access Violation 12/16/97
Company Communicator Gold for Windows v5.01 Beta
User Comments:
    "It paused about 10 seconds, then the screen went blue. I had to hit ctrl-
    alt-del to reboot."
System Info:
    Windows 98, System release 2.1a
    PentiumII 300MHz -continued

BLACK BOX EXAMPLE

65535 K Physical Ram  
Where:  
    TCPConnect( ), Network.c Line 178  
Disassembly:

```
→ 0040101E  C60000   mov   byte ptr[eax],0x0 ds:00000000=??
  00401021  8BE5     mov   esp, ebp
  00401023  5D       pop   ebp
  00401024  c3       ret
  00401025  cc       int   3
  00401026  cc       int   3
```

Registers:

```
EIP: 0040101E                                nv up ei pl nz na pe nc
ESP: 0012FF7C    EBP: 0012FF80   CS: 001B    SS: 0023
EAX: 07FED132    EBX: 00000000   DS: 0023    ES: 0023
ECX: 000001A0    EDX: 00420290   FS: 0038    GS: 0000
ESI: 77F6C1CA    EDI: 77FA55b0   I/O Privilege Level : 0
```

Stack Back Trace:

| FramePtr | Return | Param 1 | Param 2 | Param 3 | Param 4 | Func Name |
|---|---|---|---|---|---|---|
| 0012FF80 | 00401135 | 00000001 | 00420250 | 00420290 | 77FA55B0 | test!main |
| 0012FF80 | 77F1B304 | 77FA55B0 | 77F6C1CA | 7FFDF000 | C0000005 | test!mainCRTStartup |
| 0012FF80 | 00000000 | 00401030 | 00000000 | 00000000 | 77FA5AA0 | kernel32!GetProcess . . . |
| 0012FF80 | 00000000 | 00000000 | 00000000 | 00000000 | 00000000 | test!<nosymbols> |

Stack Dump:

| Address | Data | | | | | | | | | | | | | | | | ascii |
|---|---|---|---|---|---|---|---|---|---|---|---|---|---|---|---|---|---|
| 0012FF7C | F7 | 4A | 00 | 00 | 1A | 00 | 09 | 10 | 03 | 00 | 00 | 00 | DE | 4A | 00 | 00 | .J..........J.. |
| 0012FF7C | E4 | 4A | 00 | 00 | 0B | 00 | 02 | 00 | F8 | 4A | 00 | 00 | 00 | 00 | 00 | 00 | .J......J...... |
| 0012FF7C | 12 | 00 | 01 | 12 | 03 | 00 | 00 | 00 | 74 | 00 | 00 | 00 | B8 | 10 | 00 | 00 | ........t....... |
| 0012FF7C | 74 | 00 | 00 | 00 | 1A | 00 | 09 | 10 | 03 | 00 | 00 | 00 | DE | 4A | 00 | 00 | t............J.. |
| 0012FF7C | E4 | 4A | 00 | 00 | 0B | 00 | 03 | 00 | FA | 4A | 00 | 00 | 00 | 00 | 00 | 00 | .J......J...... |
| 0012FF7C | 12 | 00 | 06 | 12 | 03 | 00 | 00 | 00 | F9 | 4A | 00 | 00 | 03 | 00 | 00 | 00 | .........J...... |
| 0012FF7C | FB | 4A | 00 | 00 | 1A | 00 | 09 | 10 | 03 | 00 | 00 | 00 | DE | 4A | 00 | 00 | .J...........J.. |
| 0012FF7C | F7 | 4A | 00 | 00 | 1A | 00 | 09 | 10 | 03 | 00 | 00 | 00 | DE | 4A | 00 | 00 | .J...........J.. |
| 0012FF7C | E4 | 4A | 00 | 00 | 0B | 00 | 02 | 00 | F8 | 4A | 00 | 00 | 00 | 00 | 00 | 00 | .J......J...... |
| 0012FF7C | 12 | 00 | 01 | 12 | 03 | 00 | 00 | 00 | 74 | 00 | 00 | 00 | B8 | 10 | 00 | 00 | ........t....... |
| 0012FF7C | 74 | 00 | 00 | 00 | 1A | 00 | 09 | 10 | 03 | 00 | 00 | 00 | DE | 4A | 00 | 00 | t............J.. |
| 0012FF7C | E4 | 4A | 00 | 00 | 0B | 00 | 03 | 00 | FA | 4A | 00 | 00 | 00 | 00 | 00 | 00 | .J......J...... |
| 0012FF7C | 12 | 00 | 06 | 12 | 03 | 00 | 00 | 00 | F9 | 4A | 00 | 00 | 03 | 00 | 00 | 00 | .........J...... |
| 0012FF7C | FB | 4A | 00 | 00 | 1A | 00 | 09 | 10 | 03 | 00 | 00 | 00 | DE | 4A | 00 | 00 | .J...........J.. |
| 0012FF7C | F7 | 4A | 00 | 00 | 1A | 00 | 09 | 10 | 03 | 00 | 00 | 00 | DE | 4A | 00 | 00 | .J...........J.. |
| 0012FF7C | E4 | 4A | 00 | 00 | 0B | 00 | 02 | 00 | F8 | 4A | 00 | 00 | 00 | 00 | 00 | 00 | .J......J...... |
| 0012FF7C | 12 | 00 | 01 | 12 | 03 | 00 | 00 | 00 | 74 | 00 | 00 | 00 | B8 | 10 | 00 | 00 | ........t....... |
| 0012FF7C | 74 | 00 | 00 | 00 | 1A | 00 | 09 | 10 | 03 | 00 | 00 | 00 | DE | 4A | 00 | 00 | t............J.. |
| 0012FF7C | E4 | 4A | 00 | 00 | 0B | 00 | 03 | 00 | FA | 4A | 00 | 00 | 00 | 00 | 00 | 00 | .J......J...... |

As shown, the black box is a collection of data records and may include a plurality of different pieces of information relating to a triggering event. In this example, the triggering event was an access violation in a browser software application. The information may include user comments (i.e., what happened from the user's point of view when the triggering event occurred), static system hardware information (i.e., the version of the operating system, the processor type and the amount of memory), the source file and line number that causes the triggering event (i.e., the TCPConnect( ) routine within the application network.c at line 178), the disassembly of the assembly language code at the point of the access violation in the software application, the register values at the time of the access violation, the program back trace at the time of the access violation, and a stack dump. As described above, the server, based on the build process for the software application, may map the information in the black box to source file level information. For example, the processor register values are mapped back to the variable names and the stack traces are mapped back to the function names and parameters within the source file. From all of this information in the black box, the developer of the browser software may be able to determine what caused the triggering event and how to prevent the triggering event from occurring in the future.

In accordance with the invention, a system may be set up in which there are two servers which are resident at different facilities. For example, a large corporation with a corporate intranet and many users connected to the intranet may permit a client nub to gather information about a web browser for the web browser developer, but also wants to prevent the flow of confidential information from the large corporation to the web browser developer due to the information gathered by the client nub. Therefore, there may be a first server at the large corporation's site and a second server at the web browser developer's site. Thus, in operation, the client nubs gather information and communicates the black box to the server at the large corporation when a triggering event occurs. The server at the large corporation then filters the information within the black box to remove any confidential information of the large corporation and then forwards the filtered black box information on to the web browser developer's server which performs the server operations described above. The developer, based on the information provided by the large corporation's server, may provide a knowledge base of recognizers (rules) to the large corporation that help the large corporation automatically troubleshoot and handle its most common problems.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A system for monitoring the operation of a plurality of computer-based systems connected to a server, each computer-based system having a microprocessor that executes one or more software applications, the system comprising:

means resident on each computer-based system for gathering information about the operation of the computer-based system including the one or more software applications to generate data records, the information including user and system describing an event sequence occurring prior to and after a predetermined triggering event, the predetermined triggering event including events associated with the one or more software application;

means resident on each computer-based system for communicating the data records to the server over a communications link upon the occurrence of the predetermined triggering event; and means resident on the server for processing the data records to generate data that is used to monitor the operation of the plurality of computer-based systems connected to the server including the operation of the one or more software applications.

2. The system of claim 1, further comprising means for communicating configuration information back to the gathering means resident on the plurality of computer-based systems in order to determine what information is going to be gathered by the gathering means.

3. The system of claim 1, wherein said communicating means comprises means for adding new types of information into the information gathered by the gathering means.

4. The system of claim 1, wherein the processing means further comprises means for receiving software application build data, means for converting said data record into source file level information using the software application build data.

5. The system of claim 1, wherein said gathered information comprises static configuration data about the configuration of the hardware of the computer-based system.

6. The system of claim 1, wherein said gathered information comprises static data about the static characteristics of a software application being executed by the computer-based system.

7. The system of claim 1, wherein said gathered information comprises dynamic information about the operation of the computer-based system.

8. The system of claim 1, wherein said gathered information comprises information about the execution of a particular software application being executed by the computer-based system.

9. The system of claim 1, wherein said gathered information comprises information about the operation of a microprocessor within the computer-based system.

10. The system of claim 1 further comprising means resident on each computer-based system for filtering out a portion of the data records gathered by the gathering means.

11. The system of claim 1, wherein said processing means further comprises means for filtering out a portion of said data records.

12. The system of claim 11, wherein said filtering means resident in each computer-based system and the filtering means in the server comprise a filter written using a filtering language so that the filter may be executed on the computer-based system or the server.

13. The system of claim 1 further comprising means for storing the data records in the computer-based system until the triggering event occurs.

14. The system of claim 13, wherein the storing means comprises a piece of hardware added to the computer-based system having a random access memory for storing data records.

15. The system of claim 13, wherein said storing means comprises a random access memory for storing the data records if a hard disk of the computer-based system is not available.

16. The system of claim 13, wherein the storing means comprises means for forward error correcting the data records and means for storing the forward error corrected data records in a plurality of locations in the computer-based system.

17. The system of claim 1, wherein said information gathering means comprises a software application being executed by the computer-based system.

18. The system of claim 1, wherein the gathering means comprises means for setting points in a software application at which data is gathered.

19. The system of claim 1 wherein the communication means on each computer-based system comprises means for storing the data records in the computer-based system and means for communicating the data records to the server when a communications link is available.

20. The system of claim 1 wherein the server is located at the site of a software application developer and said system further comprising a second server computer located at the site of a customer, said second server further comprising means for receiving data records from the gathering means, means for determining whether to filter information out of the data records, and means for communicating the received and any filtered data records to the server at the site of the software application developer.

21. The system of claim 1, wherein the processing means further comprises means for generating an automated response addressed to a user of a computer-based system in response to a data record.

22. The system of claim 21, wherein said automated response is transmitted via electronic mail.

23. The system of claim 21, wherein said automated response is transmitted via pager.

24. The system of claim 1, wherein said processing means further comprises means for identifying patterns in the data records from the plurality of computer-based systems to generate additional information.

25. The system of claim 24, wherein said identifying means further comprises means for automatically communicating configuration data to the computer-based systems based on the additional information.

26. The system of claim 1, wherein said processing means further comprises means for recognizing particular data in a data record, the recognizer means including a plurality of rules which associate particular data in the data record with a predetermined action.

27. The system of claim 26, wherein the predetermined action comprises sending an automatic electronic mail response to a user of the computer-based system about the particular data.

28. The system of claim 1, wherein the server comprises means for generating electronic mail to an operator of the system to report data about the data records received by the server.

29. The system of claim 1, wherein the server comprises means for generating correlation reports for the data records received by the server in order to identify patterns within the data records received by the server.

30. The system of claim 1, wherein the configuration information comprises watchpoints that indicate at which point the gathering means gathers information.

31. The system of claim 28, wherein the watch point comprises means for determining the time of execution of an instruction.

32. The system of claim 28, where in the watch point comprises means for determining the speed of execution of a portion of a software application.

33. The system of claim 28, where in the watchpoint comprises means for capturing data in a memory location upon the occurrence of the predetermined triggering event.

34. The system of claim 1, wherein the server comprises means for generating a query of the data records received by the server wherein the query is based on a key in the data records.

35. The system of claim 34, wherein the key is selected from one of a static data record and a dynamic data record.

36. The system of claim 34, wherein the query generator comprises means for generating a report indicating the similarities and differences in the data records received by the server.

37. The system of claim 1, wherein said gathering means comprises means integrated with a microprocessor for gathering information about the operation of the microprocessor.

38. The system of claim 37, wherein the microprocessor gathering means comprises means for capturing a history of instructions executed by the microprocessor.

39. The system of claim 38 wherein the server further comprises means for reproducing the instructions executed by the microprocessor to emulate the operation of the computer-based system.

40. A method for monitoring the operation of a plurality of computer-based systems connected to a server, each computer-based system having a microprocessor that executes one or more software applications, the method comprising:

gathering information about the operation of the computer-based system including the one or more software applications to generate data records, the information including user and system data describing an event sequence occurring prior to and after a predetermined triggering event, the predetermined triggering event including events associated with the one or more software application;

communicating the data records to the server over a communications link upon the occurrence of the predetermined triggering event; and processing the data records to generate data that is used to monitor the operation of the plurality of computer-based systems connected to the server.

41. The method of claim 40, further comprising communicating configuration information back to the plurality of computer-based systems in order to determine what information is going to be gathered.

42. The method of claim 40, wherein said communicating comprises adding new types of information into the information gathered by the gatherer.

43. The method of claim 40, wherein the processing further comprises receiving software application build data and converting said data record into source file level information using the software application build data.

44. The method of claim 40, wherein said gathered information comprises static configuration data about the configuration of the hardware of the computer-based system.

45. The method of claim 40, wherein said gathered information comprises static data about the static characteristics of a software application being executed by the computer-based system.

46. The method of claim 40, wherein said gathered information comprises dynamic information about the operation of the computer-based system.

47. The method of claim 40, wherein said gathered information comprises information about the execution of a particular software application being executed by the computer-based system.

48. The method of claim 40, wherein said gathered information comprises information about the operation of a microprocessor within the computer-based system.

49. The method of claim 40 further comprising filtering out a portion of the data records gathered.

50. The method of claim 40, wherein said processing further comprises filtering out a portion of said data records.

51. The method of claim 50, wherein said filtering resident in each computer-based system and the filtering in the server comprise a filter written using a filtering language so that the filter may be executed on the computer-based system or the server.

52. The method of claim 40 further comprising storing the data records in the computer-based system until the triggering event occurs.

53. The method of claim 52, wherein said storing comprises a random access memory for storing the data records if a hard disk of the computer-based system is not available.

54. The method of claim 52, wherein said storing comprises adding a piece of hardware to the computer-based system having a random access memory for storing the data records if a hard disk of the computer-based system is not available.

55. The method of claim 40, wherein said information gathering comprises a software application being executed by the computer-based system.

56. The method of claim 52, wherein the storing comprises generating forward error corrected data records and storing the forward error corrected data records in a plurality of locations in the computer-based system.

57. The method of claim 40, wherein the gathering comprises setting points in a software application at which data is gathered.

58. The method of claim 40 wherein the communication on each computer-based system comprises storing the data records in the computer-based system and communicating the data records to the server when a communications link is available.

59. The method of claim 40 wherein the server is located at the site of a software application developer and said system further comprising a second server computer located at the site of a customer, said second server further comprising receiving data records from the gatherer, determining whether to filter information out of the data records, and communicating the received data records and any filtered data records to the server at the site of the software application developer.

60. The method of claim 40, wherein the processing further comprises generating an automated response to a user of the computer-based system in response to a data record.

61. The method of claim 60, wherein said automated response is transmitted via electronic mail.

62. The method of claim 60, wherein said automated response is transmitted via pager.

63. The method of claim 40, wherein said processing further comprises identifying patterns in the data records from the plurality of computer-based systems to generate additional information.

64. The method of claim 63, wherein said identifying further comprises automatically communicating configuration data to the computer-based systems based on the additional information.

65. The method of claim 40, wherein said processing further comprises recognizing particular data in a data record, the recognizing including a plurality of rules which associate particular data in the data record with a predetermined action.

66. The method of claim 65, wherein the predetermined action comprises sending an automatic electronic mail response to a user of the computer-based system about the particular data.

67. The method of claim 40, wherein the server comprises generating electronic mail to an operator of the system to report data about the data records received by the server.

68. The method of claim 40, wherein the server comprises generating correlation reports for the data records received by the server in order to identify patterns within the data records received by the server.

69. The method of claim 40, wherein the configuration information comprises watchpoints which indicate at which point the gathering means gathers information.

70. The method of claim 69, wherein the watchpoint comprises determining the time of execution of instructions.

71. The system of claim 69, wherein the watchpoint comprises determining the speed of execution of a portion of a software application.

72. The system of claim 69, wherein the watchpoint comprises capturing data in a memory location upon the occurrence of the predetermined triggering event.

73. The method of claim 40, wherein the server comprises generating a query of the data records received by the server wherein the query is based on a key in the data records.

74. The method of claim 73, wherein the key is selected from one of a static data record and a dynamic data record.

75. The method of claim 74, wherein the query generator comprises generating a report indicating the similarities and differences in the data records received by the server.

76. The method of claim 40, wherein said gathering comprises gathering information about the operation of the microprocessor using a device integrated with a microprocessor.

77. The method of claim 76, wherein the microprocessor gathering comprises capturing a history of instructions executed by the microprocessor.

78. The method of claim 77 wherein the server further comprises reproducing the instructions executed by the microprocessor to emulate the operation of the computer-based system.

79. An apparatus resident on a computer-based system for monitoring the operation of the computer-based system connected to a central server, the computer-based system having a microprocessor that executes one or more software applications, the apparatus comprising:

means for gathering information about the operation of the computer-based system including the one or more software applications to generate a data record, the information including user and system data describing an event sequence occurring prior to and after a predetermined triggering event, the predetermined triggering event including events associated with the one or more software application;

means for communicating the data record to the server over a communications link upon the occurrence of the predetermined triggering event;

means for receiving configuration information from the server over the communications link to change the information that is going to be gathered by the gathering means; and means for receiving configuration information from the server in order to determine what information is going to be gathered by the gathering means.

80. The apparatus of claim 79, wherein said gathered information comprises static configuration data about the configuration of the hardware of the computer-based system.

81. The apparatus of claim 79, wherein said gathered information comprises static data about the static characteristics of a software application being executed by the computer-based system.

82. The apparatus of claim 79, wherein said gathered information comprises dynamic information about the operation of the computer-based system.

83. The apparatus of claim 79, wherein said gathered information comprises information about the execution of a particular software application being executed by the computer-based system.

84. The apparatus of claim 79, wherein said gathered information comprises information about the operation of a microprocessor within the computer-based system.

85. The apparatus of claim 79 further comprising means resident on each computer-based system for filtering out a portion of the data records gathered by the gathering means.

86. The apparatus of claim 79 further comprising means for storing the data records in the computer-based system until the triggering event occurs.

87. The apparatus of claim 86, wherein said storing means comprises a random access memory for storing the data records if a hard disk of the computer-based system is not available.

88. The apparatus of claim 79, wherein said information gathering means comprises a software application being executed by the computer-based system.

89. The apparatus of claim 88 further comprising means in the computer-based system for accumulating the data records in a black box data structure.

90. The apparatus of claim 79, wherein said plurality of computer-based systems comprises a plurality of vending machines.

91. A system on a central computer for monitoring the operation of a software application being executed on a plurality of remote computer-based systems connected by a communications link to a central computer, the system comprising:

means resident on each computer-based system for gathering information about the execution and operation of the software application to generate a data record the information including user and system data describing an event sequence occurring prior to and after a predetermined triggering event, the predetermined triggering event including events associated with the one or more software application;

means resident on each computer-based system for communicating the data record to the central computer over a communications link upon the occurrence of the predetermined triggering event;

means resident on the server for processing the data records to generate data about the operation and execution of the software application being executed by the plurality of computer-based systems; and means for communicating configuration data from the central computer back to the gathering means in order to determine what information is going to be gathered by the gathering means.

92. A system in a central computer for monitoring the operation of a plurality of computer-based systems connected by a network to the central computer, the system comprising:

means resident on each computer-based system for gathering information about the operation of the particular computer-based system to generate a data record, the information including user and system data describing an event sequence occurring prior to and after a predetermined triggering event, the predetermined triggering event including events associated with the one or more software application;

means resident on each computer-based system for communicating the data record to the central computer over the network upon the occurrence of the predetermined triggering event;

means resident on the central computer for processing the data records to generate data that is used to monitor the operation of the plurality of computer-based systems connected to the network; and means for communicating configuration data from the central computer to the gathering means in order to determine what information is going to be gathered by the gathering means.

93. A system for monitoring the operation of a plurality of computer-based systems connected to a server, each computer-based system having a microprocessor that executes one or more software applications and a plurality of hardware components associated therewith, the system comprising:

means resident on each computer-based system for gathering information about the operation of the computer-based system including the one or more software applications to generate data records, the information including user and system data describing an event sequence occurring prior to and after a predetermined triggering events the predetermined triggering event including events associated with at least one of the plurality of associated hardware components;

means resident on each computer-based system for communicating the data records to the server over a communications link upon the occurrence of the predetermined triggering event; and means resident on the server for processing the data records to generate data that is used to monitor the operation of the plurality of computer-based systems connected to the server including the operation of the one or more software applications.

94. A method for monitoring the operation of a plurality of computer-based systems connected to a server, each computer-based system having a microprocessor that executes one or more software applications and a plurality of hardware components associated therewith, the method comprising:

gathering information about the operation of the computer-based system including the one or more software applications to generate data records, the information including user and system data describing an event sequence occurring prior to and after a predetermined triggering event, the predetermined triggering event including events associated with at least one of the associated plurality of hardware components;

communicating the data records to the server over a communications link upon the occurrence of the predetermined triggering event; and processing the data records to generate data that is used to monitor the operation of the plurality of computer-based systems connected to the server.

95. An apparatus resident on a computer-based system for monitoring the operation of the computer-based system connected to a central server, the computer-based system having a microprocessor that executes one or more software applications and a plurality of hardware components associated therewith, the apparatus comprising:

means for gathering information about the operation of the computer-based system including the one or more software applications to generate a data record, the information including user and system data describing an event sequence occurring prior to and after a predetermined triggering event, the predetermined triggering event including events associated with at least one of the plurality of associated hardware components;

means for communicating the data record to the server over a communications link upon tie occurrence of the predetermined triggering event;

means for receiving configuration information from the server over the communications link to change the information that is going to be gathered by the gathering means; and means for receiving configuration information from the server in order to determine what information is going to be gathered by the gathering means.

96. A system on a central computer for monitoring the operation of a software application being executed on a plurality of remote computer-based systems connected by a communications link to a central computer, the system comprising:

means resident on each compute-based system for gathering information about the execution and operation of the software application to generate a data record, the information including user and system data describing an event sequence occurring prior to and after a predetermined triggering event, the predetermined triggering event including events associated with at least one of a plurality of hardware components associated with the computer-based system;

means resident on each computer-based system for communicating the data record to the central computer over a communications link upon the occurrence of the predetermined triggering event;

means resident on the server for processing the data records to generate data about the operation and execution of the software application being executed by the plurality of computer-based systems; and means for communicating configuration data from the central computer back to the gathering means in order to determine what information is going to be gathered by the gathering means.

97. A system in a central computer for monitoring the operation of a plurality of computer-based systems connected by a network to the central computer, the system comprising:

means resident on each computer-based system for gathering information about the operation of the particular computer-based system to generate a data record, the information including user and system data describing an event sequence occurring prior to and after a predetermined triggering event, the predetermined triggering event including events associated with at least one of a plurality of hardware components associated with the computer-based system;

means resident on each computer-based system for communicating the data record to the central computer over the network upon the occurrence of the predetermined triggering event;

means resident on the central computer for processing the data records to generate data that is used to monitor the operation of the plurality of computer-based systems connected to the network; and means for communicating configuration data from the central computer to the gathering means in order to determine what information is going to be gathered by the gathering means.

* * * * *

UNITED STATES PATENT AND TRADEMARK OFFICE
CERTIFICATE OF CORRECTION

PATENT NO.    : 6,167,358
DATED         : December 26, 2000
INVENTOR(S)   : Konstantin Othmer et al.

It is certified that error appears in the above-identified patent and that said Letters Patent is hereby corrected as shown below:

Column 23,
Line 15, after "system" please insert -- data --.

Column 29,
Line 39, please delete "events" and insert -- event, -- therefor.

Column 30,
Line 20, please delete "tie" and insert -- the -- therefor.

Signed and Sealed this

Twenty-third Day of July, 2002

Attest:

Attesting Officer

JAMES E. ROGAN
*Director of the United States Patent and Trademark Office*